(12) United States Patent
Otani et al.

(10) Patent No.: US 8,305,400 B2
(45) Date of Patent: Nov. 6, 2012

(54) DISPLAY DEVICE AND METHOD FOR LUMINANCE ADJUSTMENT OF DISPLAY DEVICE

(75) Inventors: Natsuki Otani, Kanangawa (JP); Takayuki Nakanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 12/379,451

(22) Filed: Feb. 23, 2009

(65) Prior Publication Data

US 2009/0237381 A1   Sep. 24, 2009

(30) Foreign Application Priority Data

Mar. 19, 2008  (JP) ................................ 2008-071400

(51) Int. Cl.
    *G09G 5/10* (2006.01)
(52) U.S. Cl. ....................................... 345/690; 345/207
(58) Field of Classification Search .................. 345/207, 345/694, 695, 690
    See application file for complete search history.

(56) References Cited

U.S. PATENT DOCUMENTS

| 2005/0253834 A1* | 11/2005 | Sakamaki et al. ............ 345/207 |
| 2008/0030491 A1* | 2/2008 | Kim et al. ..................... 345/207 |
| 2008/0100645 A1* | 5/2008 | Nitta ............................. 345/690 |
| 2008/0204438 A1* | 8/2008 | Song et al. .................... 345/207 |

FOREIGN PATENT DOCUMENTS

| JP | 11-295692 | 10/1999 |
| JP | 2007-065239 A | 3/2007 |
| JP | 2007-322830 | 12/2007 |

OTHER PUBLICATIONS

Japanese Office Action issue Feb. 16, 2010 for corresponding Japanese Application No. 2008-071400.

* cited by examiner

*Primary Examiner* — Adam R Giesy
(74) *Attorney, Agent, or Firm* — Rader Fishman & Grauer, PLLC

(57) ABSTRACT

Disclosed herein is a display device that displays a desired image on an effective pixel area in which sub-pixels are arranged in a matrix, the display device including: an ambient light sensor configured to be provided in a predetermined sub-pixel in the effective pixel area, the ambient light sensor receiving ambient light and outputting a result of detection of an ambient light amount for adjustment of luminance of the image; and a hue correction mechanism configured to correct local hue change due to provision of the ambient light sensor in the predetermined sub-pixel.

15 Claims, 20 Drawing Sheets

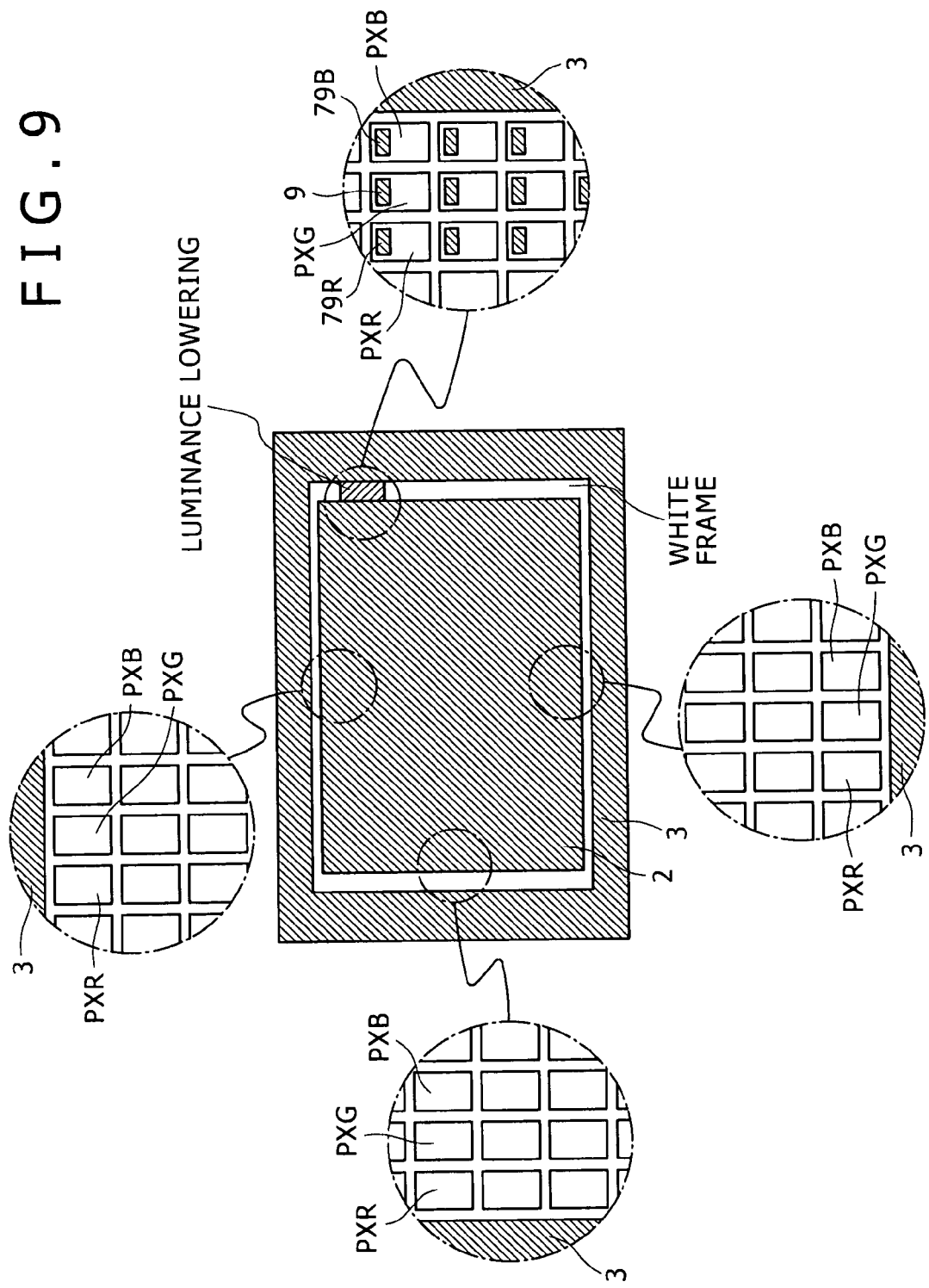

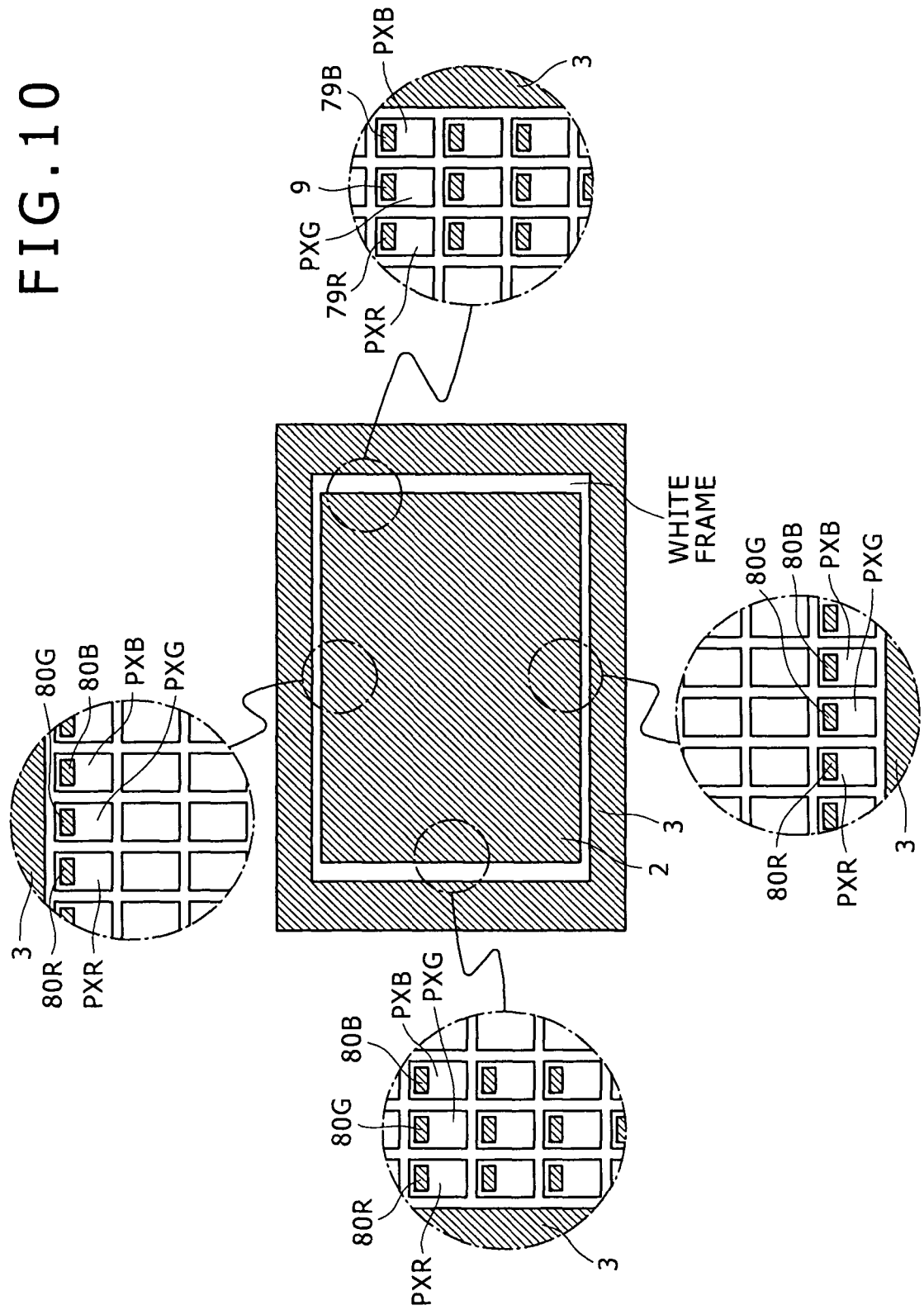

Sgata

Ssig

Scs

VPXG

VPXR,VPXB

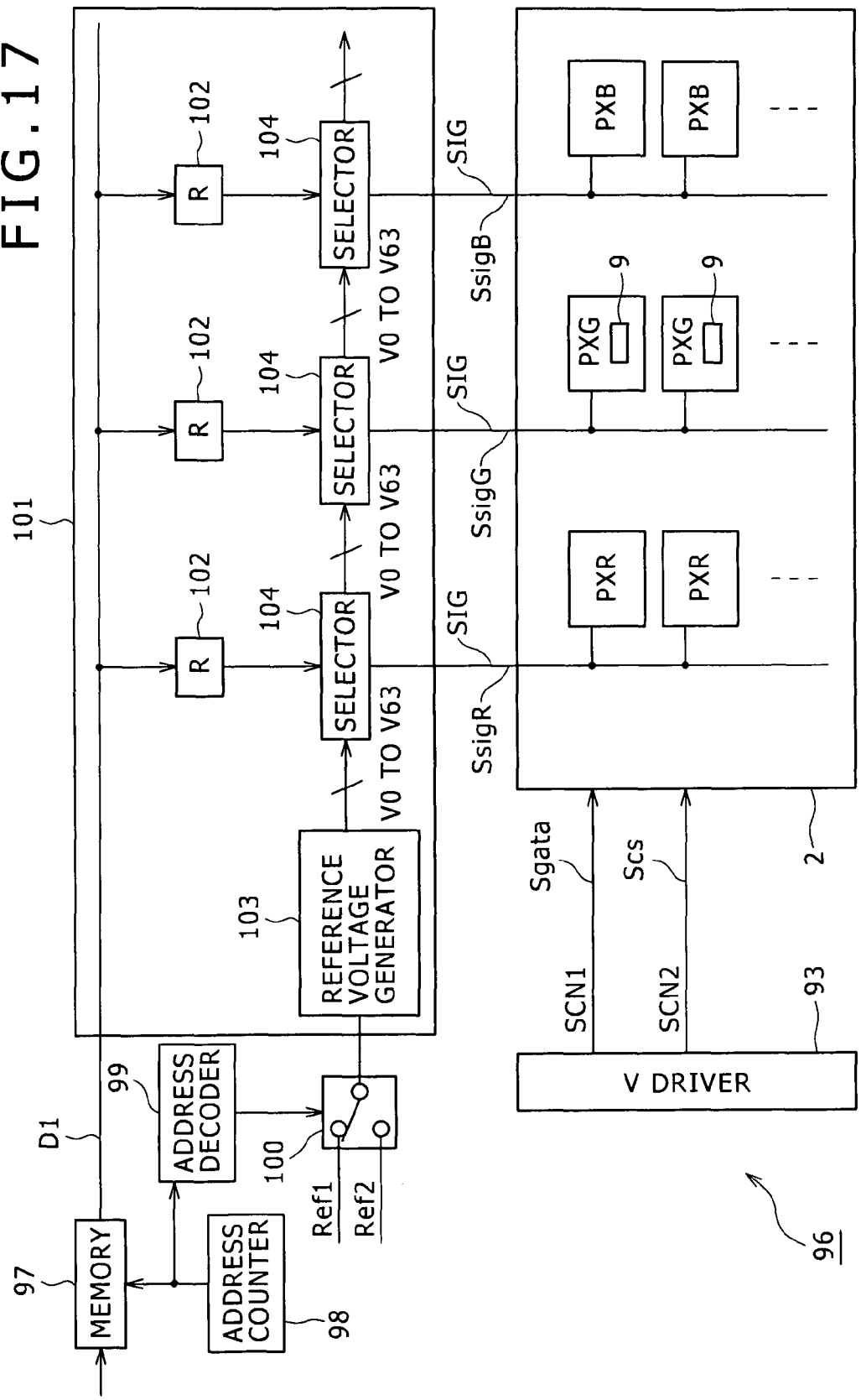

PRIOR ART

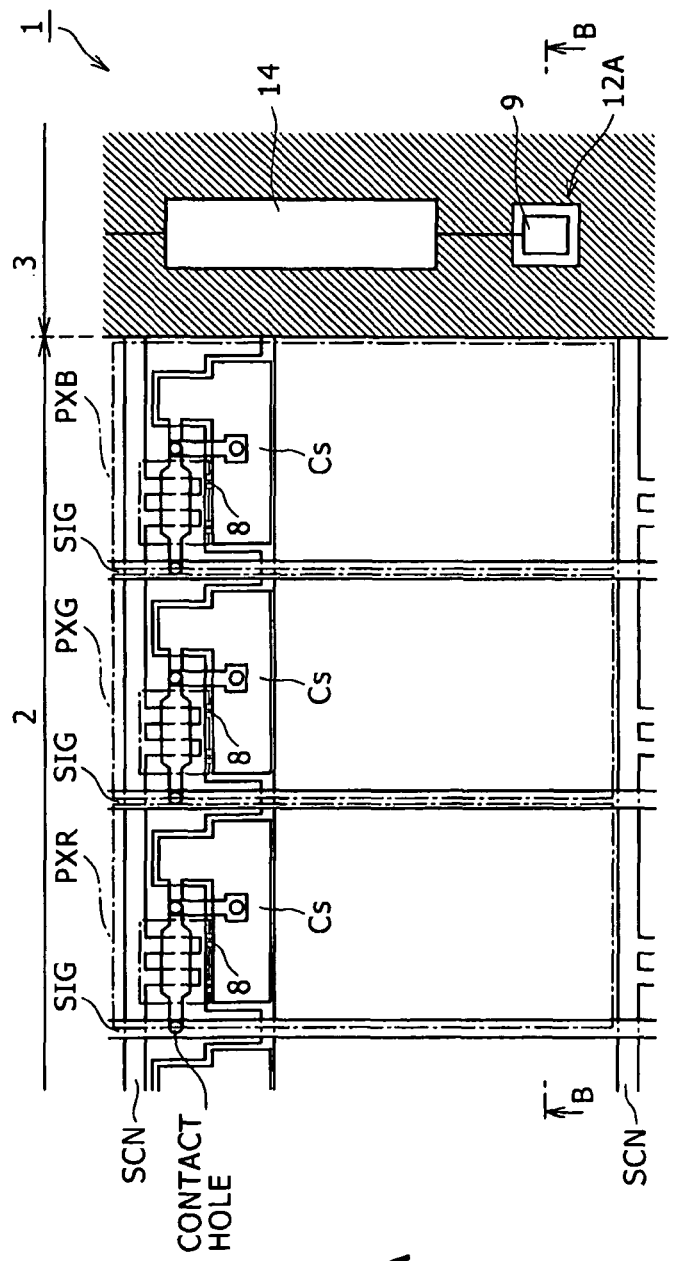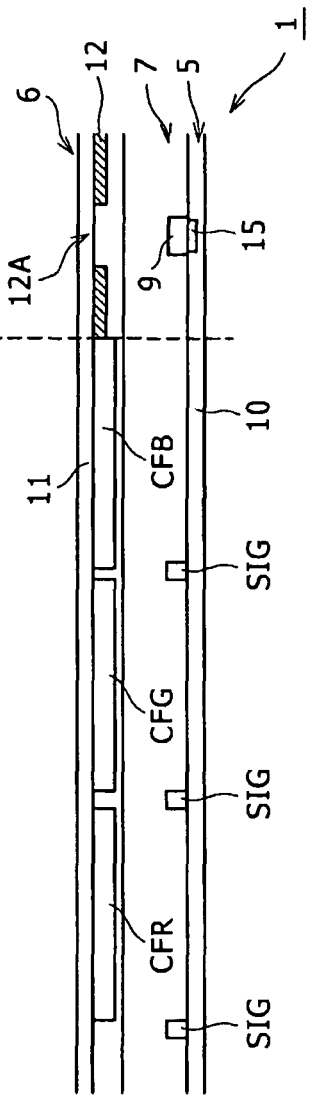
FIG. 21A
FIG. 21B
PRIOR ART

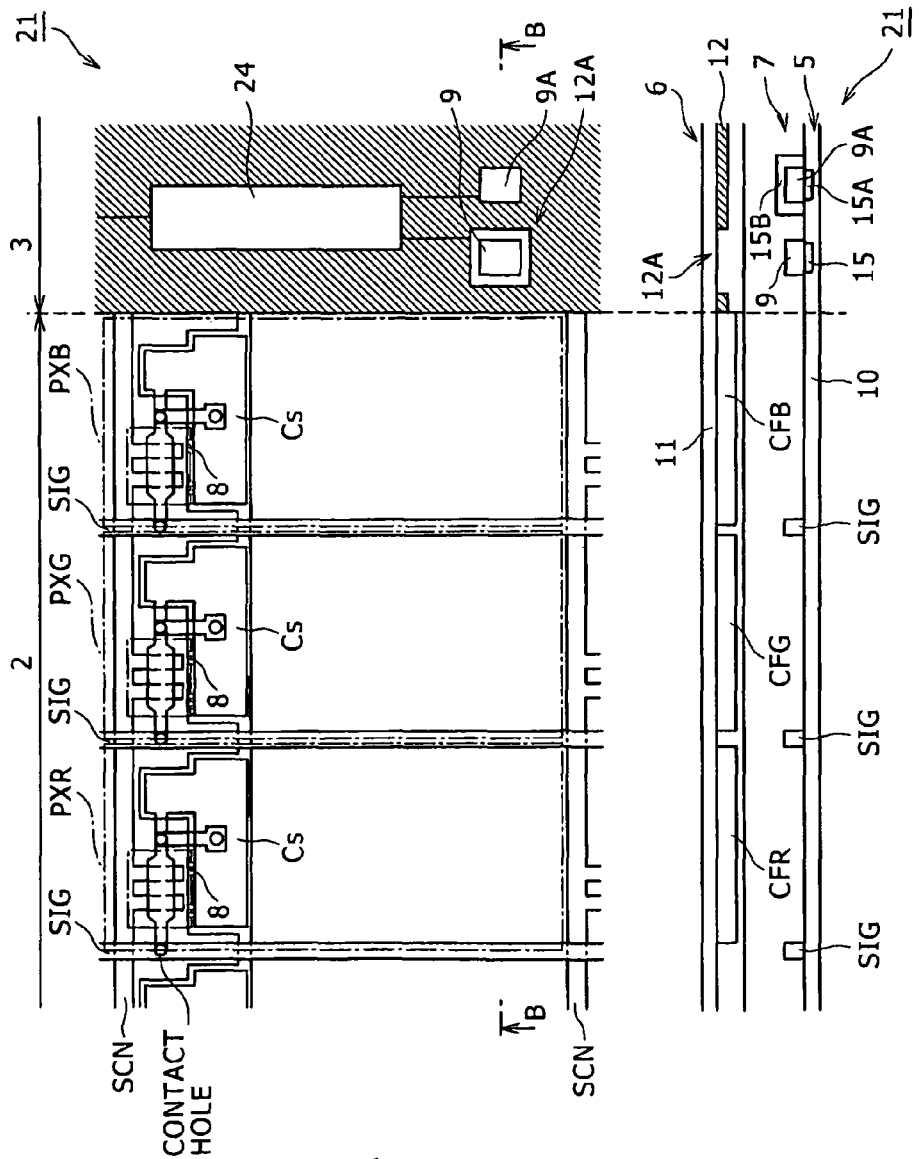

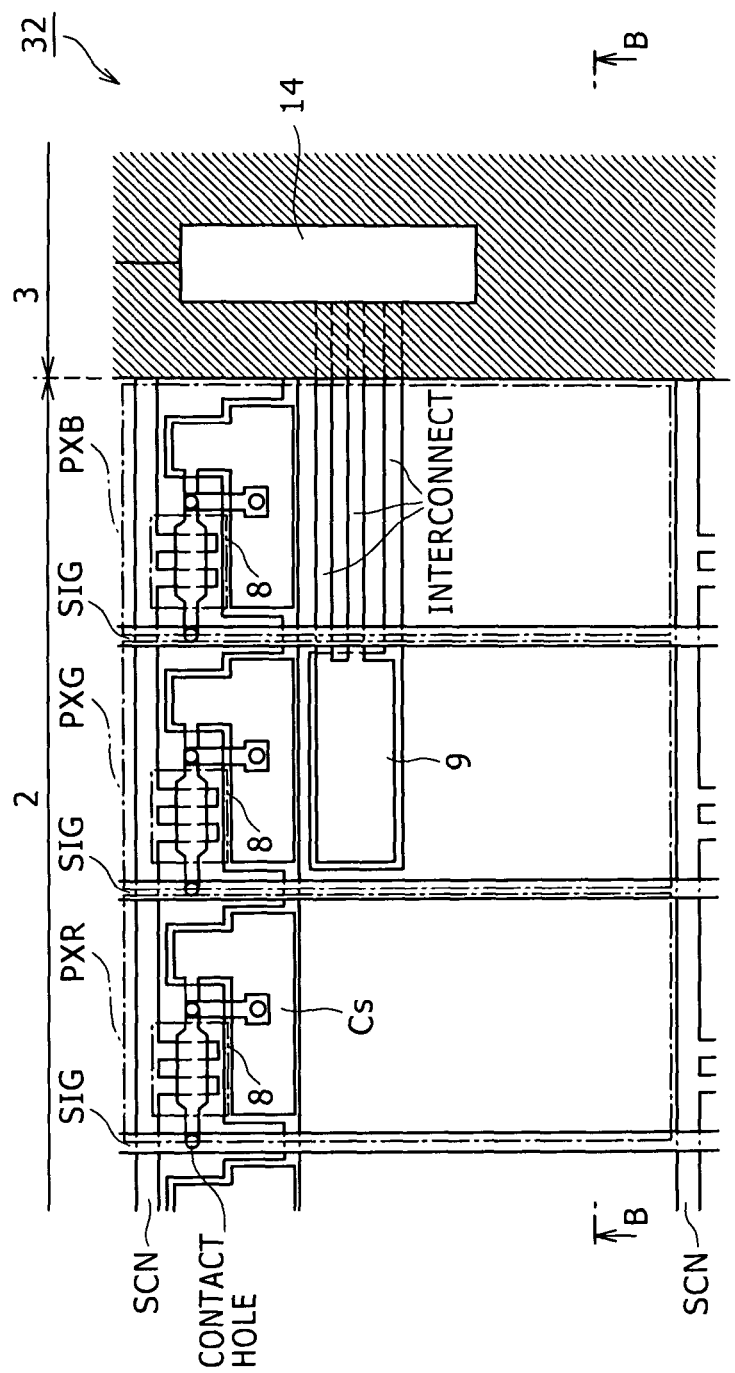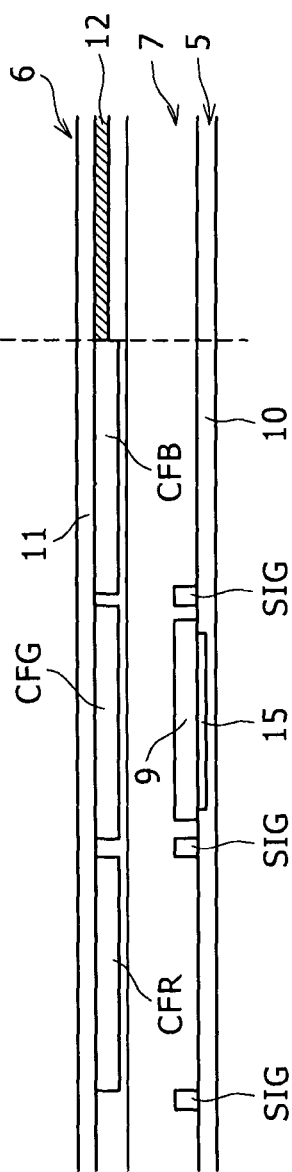
FIG.24A
FIG.24B

DISPLAY DEVICE AND METHOD FOR LUMINANCE ADJUSTMENT OF DISPLAY DEVICE

CROSS REFERENCES TO RELATED APPLICATIONS

The present invention contains subject matter related to Japanese Patent Application JP 2008-071400 filed in the Japan Patent Office on Mar. 19, 2008, the entire contents of which being incorporated herein by reference.

BACKGROUND OF THE INVENTION

1. Field of the Invention

The present invention relates to a display device and a method for luminance adjustment of a display device, and can be applied to e.g. a liquid crystal display device. The present invention is to allow effective avoidance of image quality deterioration although an ambient light sensor for detection of the ambient light amount is provided in the effective pixel area, by correcting hue change due to an aperture ratio decrease accompanying the provision of the ambient light sensor by use of a hue correction mechanism.

2. Description of the Related Art

Among various kinds of display devices such as liquid crystal display devices, ones in which luminance adjustment is carried out depending on the ambient light amount have been provided. In particular, in some portable liquid crystal display devices such as electronic still cameras and cellular phones, the luminance of the display screen is adjusted through control of the luminance of the backlight to thereby ensure the visibility and reduce the power consumption, as disclosed in e.g. Japanese Patent Laid-Open No. Hei 11-295692.

In a related-art liquid crystal display device of this kind, the ambient light amount is detected by an ambient light sensor as a light-receiving element that receives ambient light. A configuration in which this ambient light sensor is provided in a liquid crystal display panel is disclosed in e.g. Japanese Patent Laid-Open No. 2007-322830.

FIG. 20 is a plan view showing a liquid crystal display panel applied to the liquid crystal display device of this kind. A liquid crystal display panel 1 includes an effective pixel area 2 formed by arranging sub-pixels in a matrix and displays various kinds of images by this effective pixel area 2. Furthermore, in the liquid crystal display panel 1, a light-blocking area 3 with a certain width is so formed as to surround this effective pixel area 2, so that the effective pixel area 2 is rimmed with a black frame formed of this light-blocking area 3. In the liquid crystal display panel 1, various drive circuits for driving the sub-pixels in the effective pixel area 2 are provided in this light-blocking area 3 and a peripheral area 4 around this light-blocking area 3. Moreover, in the liquid crystal display panel 1, e.g. a certain part along predetermined-one side is used as an area AR of external lead-out terminals, and power and so on is provided from the external lead-out terminals in this area AR.

FIG. 21A is an enlarged plan view of the peripheral part of the effective pixel area 2 indicated by symbol A in FIG. 20, and FIG. 21B is a sectional view along line B-B in this plan view. In the liquid crystal display panel 1, a liquid crystal 7 is sandwiched between a TFT (thin film transistor) substrate 5 and a CF substrate 6. The TFT substrate 5 is formed by providing, over a glass substrate 10 as a transparent insulating substrate, transistors 8 as thin film transistors (TFTs) included in red, green, and blue sub-pixels PXR, PXG, and PXB, hold capacitors Cs, pixel electrodes, an alignment film, and so on together with an ambient light sensor 9, signal lines SIG, scan lines SCN, and so on. The CF substrate 6 is formed by providing, over a glass substrate 11 as a similar transparent insulating substrate, a counter electrode, an alignment film, red, green, and blue color filters CFR, CFG, and CFB, and so on together with a light-blocking film 12 serving as the light-blocking area 3.

In the liquid crystal display panel 1 of the related art, the ambient light sensor 9 is provided at a position adjacent to the effective pixel area 2, in the light-blocking area 3. Furthermore, in the liquid crystal display panel 1, a sensor circuit 14 that is close to the ambient light sensor 9 and processes the output signal of the ambient light sensor 9 is provided in the light-blocking area 3. As the ambient light sensor 9, any of various photodetectors such as phototransistors and photodiodes is used. For the ambient light sensor 9, a light-blocking film 15 that blocks light from the backlight is provided on the glass substrate 10 side thereof. An aperture 12A that allows the incidence of ambient light on the ambient light sensor 9 is formed in the light-blocking film 12 on the CF substrate 6.

Used as the sensor circuit 14 is e.g. an integrating circuit that integrates the output signal of the ambient light sensor 9 with certain time interval and certain integration time in synchronization with the operation of the effective pixel area 2. In the related-art liquid crystal display panel 1, the output signal of the sensor circuit 14 is input to an external circuit, and the backlight is so controlled by this external circuit that the light amount of the backlight increases as the ambient light amount increases.

As shown in FIGS. 22A and 22B based on comparison with FIGS. 21A and 21B, in a liquid crystal display panel 21 as one of other proposed liquid crystal display panels of this kind, a correction sensor 9A is further provided and the light-reception result by the ambient light sensor 9 is corrected by the output signal of this correction sensor 9A. The correction sensor 9A has the same configuration as that of the ambient light sensor 9, except that the correction sensor 9A is prevented from receiving light from the backlight and ambient light. Specifically, a light-receiving element having substantially the same characteristics as those of the ambient light sensor 9 is used as the correction sensor 9A. More specifically, a light-receiving element having the same configuration, shape, and size as those of the ambient light sensor 9 is disposed adjacent to the ambient light sensor 9. The correction sensor 9A is so configured as to be prevented from receiving ambient light besides light from the backlight. Specifically, the correction sensor 9A is provided with a light-blocking film 15A that blocks light from the backlight similarly to the ambient light sensor 9. In addition, the whole of the correction sensor 9A is covered by a light-blocking component 15B so that it may be prevented from receiving light through the aperture 12A.

In this liquid crystal display panel 21, a sensor circuit 24 is provided instead of the sensor circuit 14. The sensor circuit 24 subtracts the output signal of the correction sensor 9A from the output signal of the ambient light sensor 9, to thereby prevent the light-reception result from changing due to dark current of the ambient light sensor 9. This subtraction processing for the output signal may be executed before the integration processing for the output signal of the ambient light sensor 9. Alternatively, it may be executed after integration of the output signal of the correction sensor 9A and the integration processing for the output signal of the ambient light sensor 9.

As shown in FIGS. 23A and 23B based on comparison with FIGS. 20 and 21A and 21B, in a display device 31 of the related art, a rectangular aperture 32A is formed in a case 32, and the liquid crystal display panel 1 or 21 is disposed inside this case 32 in alignment with the aperture 32A. In the display device 31, the size of the aperture 32A is so designed as to ensure the following states: the effective pixel area 2 is visible through the aperture 32A; ambient light enters the ambient light sensor 9 through the aperture 32A; and the peripheral area 4 around the light-blocking area 3 and the area AR of the external lead-out terminals are covered and hidden by the case 32. In addition, a guide or the like that defines the mounting position of the liquid crystal display panel 1 or 21 is provided.

Consequently, in the display device 31, the effective pixel area 2 is disposed inside the aperture 32A in such a manner as to be rimmed with a black frame that is formed of a part of the light-blocking area 3 and has a certain width D.

SUMMARY OF THE INVENTION

It is required to decrease the size of the display device 31. Therefore, it is also required to decrease the width D of the black frame around the effective pixel area 2 visible through the aperture 32A (see FIGS. 23A and 23B). Furthermore, the black frame having a large width impairs the appearance of the display screen. Also for this reason, decreasing the width D of this black frame is required. Thus, it is required to decrease the size of the aperture 32A as much as possible.

However, the display device 31 inevitably involves the occurrence of an error in the mounting of the liquid crystal display panel 1 or 21 to the case 32, and therefore decreasing the size of the aperture 32A will lead to the possibility that the incidence of ambient light on the ambient light sensor 9 is hindered by the case 32. Specifically, if the error in the mounting of the liquid crystal display panel 1 or 21 is large, all or a part of the aperture 12A is possibly covered by the case 32, so that the incidence of ambient light on the ambient light sensor 9 is hindered. This results in difficulty in accurate luminance adjustment of the liquid crystal display device 31.

As one of methods to solve this problem, a method of providing the ambient light sensor in the effective pixel area will be available. This method can prevent the case from blocking the light incidence on the ambient light sensor and allows easier luminance adjustment with higher accuracy compared with the related art.

However, as shown in FIGS. 24A and 24B based on comparison with FIGS. 21A and 21B, if the ambient light sensor 9 for detection of the ambient light amount is provided in the effective pixel area, the aperture area of the sub-pixel PXG in which the ambient light sensor 9 is disposed becomes smaller than that of the other sub-pixels PXR and PXB. This results in a local decrease in the luminance value of this sub-pixel PXG. As a result, the aperture ratio of the green pixel is lowered and the hue changes in one pixel for color images, including this sub-pixel PXG. Consequently, this liquid crystal display panel 32 involves a problem that the image quality is deteriorated due to the provision of the ambient light sensor 9.

Specifically, for example, if the ambient light sensor 9 is disposed in the green sub-pixel PXG among the red, green, and blue sub-pixels PXR, PXG, and PXB that form one pixel for color images, the luminance value of the green sub-pixel PXG among these red, green, and blue sub-pixels PXR, PXG, and PXB is lowered. As a result, in displaying of white, this pixel expresses a purplish color due to insufficiency in the pixel value of the green sub-pixel.

There is a need for the present invention to propose a display device and a method for luminance adjustment of a display device, each allowing effective avoidance of image quality deterioration although an ambient light sensor for detection of the ambient light amount is provided in the effective pixel area.

According to a first embodiment of the present invention, there is provided a display device that displays a desired image on an effective pixel area in which sub-pixels are arranged in a matrix. The display device includes an ambient light sensor configured to be provided in a predetermined sub-pixel in the effective pixel area. The ambient light sensor receives ambient light and outputs the result of detection of the ambient light amount for adjustment of the luminance of the image. The display device further includes a hue correction mechanism configured to correct local hue change due to provision of the ambient light sensor in the predetermined sub-pixel.

According to a second embodiment of the present invention, there is provided a method for luminance adjustment of a display device that displays a desired image on an effective pixel area in which sub-pixels are arranged in a matrix. The method includes the steps of receiving ambient light by an ambient light sensor provided in a predetermined sub-pixel in the effective pixel area and outputting the result of detection of the ambient light amount for adjustment of the luminance of the image, adjusting the luminance of the image based on the result of the detection of the ambient light amount, and correcting local hue change due to provision of the ambient light sensor in the predetermined sub-pixel by a hue correction mechanism.

According to a third embodiment of the present invention, there is provided a display device that displays a desired image on an effective pixel area in which sub-pixels are arranged in a matrix. The display device includes an ambient light sensor configured to be provided in a predetermined sub-pixel in the effective pixel area. The ambient light sensor receives ambient light and outputs the result of detection of the ambient light amount. The display device further includes a hue correction mechanism configured to correct local hue change due to provision of the ambient light sensor in the predetermined sub-pixel.

According to the configurations of the first and second embodiments of the present invention, the ambient light sensor provided in the effective pixel area allows outputting of the result of detection of the ambient light amount for luminance adjustment while effectively avoiding the situation in which the incidence of ambient light on the ambient light sensor is hindered, arising due to a case and so on when the ambient light sensor is provided outside the effective pixel area. Therefore, according to the configurations of the first and second embodiments of the present invention, a display device can be fabricated more easily through a simplified mounting process therefor compared with the related arts, and the luminance adjustment can be carried out with higher accuracy. Furthermore, the hue correction mechanism in the configurations of the first and second embodiments of the present invention can prevent local hue change due to the lowering of the aperture area of the sub-pixel in which the ambient light sensor is disposed. These features allow the configurations of the first and second embodiments of the present invention to effectively avoid image quality deterioration although the ambient light sensor for detection of the ambient light amount is provided in the effective pixel area.

The configuration of the third embodiment of the present invention can be applied to e.g. the case in which a display device equipped with a touch sensor is formed by disposing the ambient light sensor in the effective pixel area, and allows prevention of local hue change due to the lowering of the aperture area of the sub-pixel in which the ambient light sensor is disposed. As a result, image quality deterioration can be prevented.

The embodiments of the present invention can effectively avoid image quality deterioration although the ambient light sensor for detection of the ambient light amount is provided in the effective pixel area.

BRIEF DESCRIPTION OF THE DRAWINGS

FIG. 9 is a plan view for explaining displaying of a white frame image relating to a liquid crystal display device according to a third embodiment of the present invention;

FIG. 10 is a plan view showing a liquid crystal display panel applied to the liquid crystal display device according to the third embodiment of the present invention;

FIG. 17 is a connection diagram showing a liquid crystal display panel applied to a liquid crystal display device according to a fifth embodiment of the present invention;

FIGS. 21A and 21B are plan view and sectional view showing the details of the liquid crystal display panel of FIG. 20;

FIGS. 22A and 22B are plan view and sectional view showing the details of another example of the related-art liquid crystal display panel;

FIGS. 24A and 24B are plan view and sectional view for explaining provision of an ambient light sensor in the effective pixel area.

DETAILED DESCRIPTION OF THE PREFERRED EMBODIMENTS

Embodiments of the present invention will be described in detail below with reference to appropriate drawings.

First Embodiment (1) Configuration of First Embodiment
(1-1) Entire Configuration (FIGS. 2 to 6)

Figure 2A:
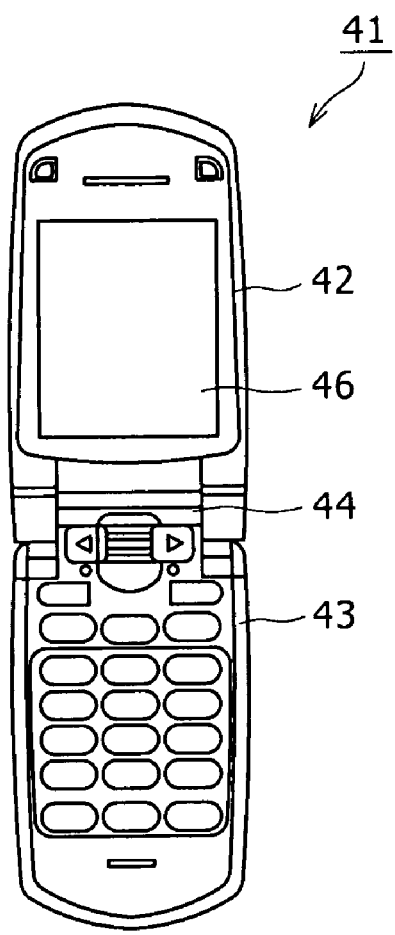
FIGS. 2A and 2B are plan views showing one example of the display device of FIGS. 1A and 1B.
Figure 2B:
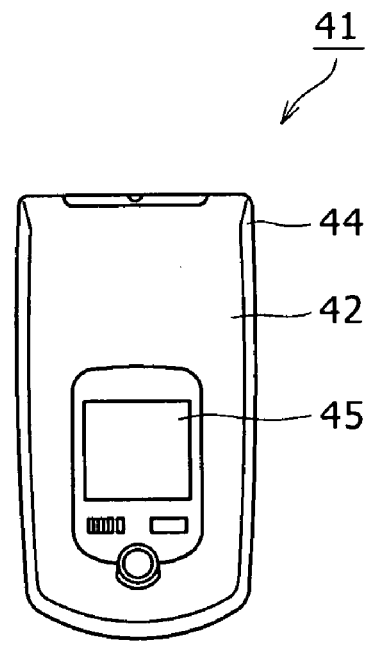

FIGS. 2A and 2B are plan views showing a cellular phone as a display device according to a first embodiment of the present invention. FIG. 2A shows a cellular phone 41 in the opened state, and FIG. 2B shows it in the folded state. This cellular phone 41 includes an upper case 42, a lower case 43, and a connection 44 that allows the upper case 42 to be foldably connected to the lower case 43. In this cellular phone 41, a sub-display part 45 is provided outside the upper case 42 so that a user can be informed of various kinds of information when the cellular phone 41 is in the folded state. Furthermore, in the cellular phone 41, a main display part 46 is provided inside the upper case 42 so that a user can be informed of various kinds of information when the cellular phone 41 is in the opened state. The configuration according to the embodiment of the present invention is applied to the main display part 46 and the sub-display part 45 in the cellular phone 41.

Figure 3:
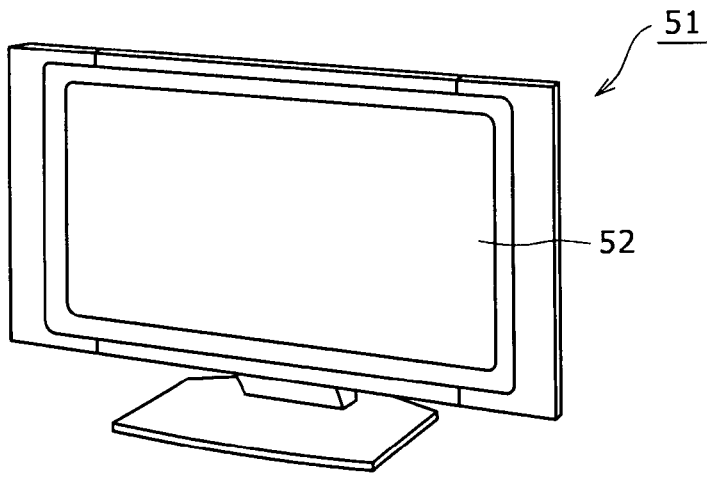
FIG. 3 is a perspective view showing another example of the display device of FIGS. 1A and 1B.

The embodiments of the present invention can be widely applied to various kinds of electronic apparatus having a display part that displays various kinds of images and information, besides the cellular phones. FIGS. 3 to 6 are diagrams showing other examples of electronic apparatus to which the configuration according to the embodiment of the present invention is applied. FIG. 3 is a perspective view showing a television receiver. This television receiver 51 has a display part 52 on the front face thereof. In the television receiver 51, the configuration according to the embodiment of the present invention is applied to this display part 52.

Figure 4A:
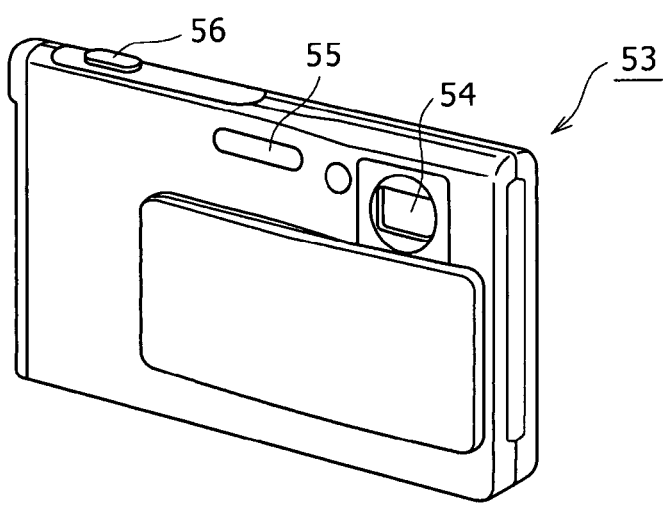
FIGS. 4A and 4B are perspective views showing another example of the display device of FIGS. 1A and 1B, different from the example of FIG. 3.
Figure 4B:
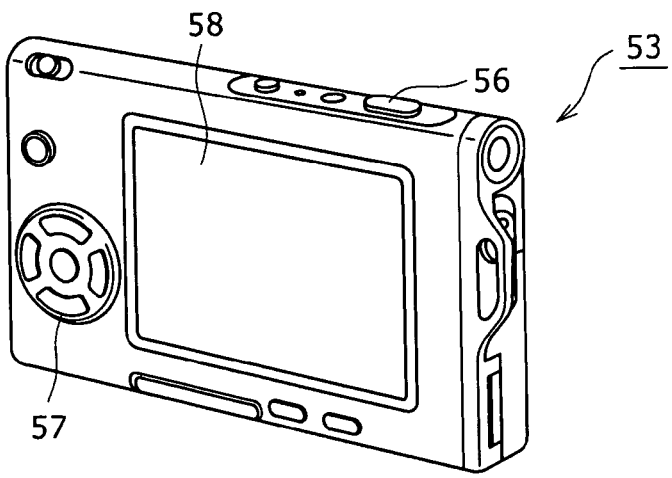

FIGS. 4A and 4B are perspective views showing an electronic still camera. FIG. 4A is a perspective view of the front side of this electronic still camera 53, and FIG. 4B is a perspective view of the backside thereof. A lens 54 and a light emitter 55 for flash light are provided on the front face of the electronic still camera 53, and a shutter button 56 is provided on the upper end surface thereof. Furthermore, a menu switch 57 and a display part 58 are provided on the backside of the electronic still camera 53. In the electronic still camera 53, the configuration according to the embodiment of the present invention is applied to this display part 58.

Figure 5:
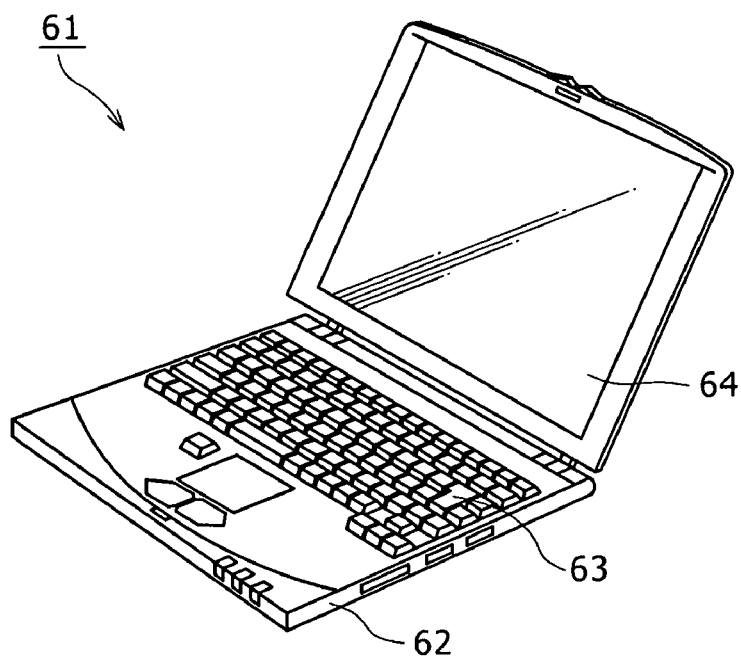
FIG. 5 is a perspective view showing another example of the display device of FIGS. 1A and 1B, different from the examples of FIGS. 3 and 4.

FIG. 5 is a perspective view showing a notebook personal computer. In this notebook personal computer 61, a keyboard 63 and so on is provided in a main body 62 and a display part 64 is provided on the upper case side. In the notebook personal computer 61, the configuration according to the embodiment of the present invention is applied to this display part 64.

Figure 6:
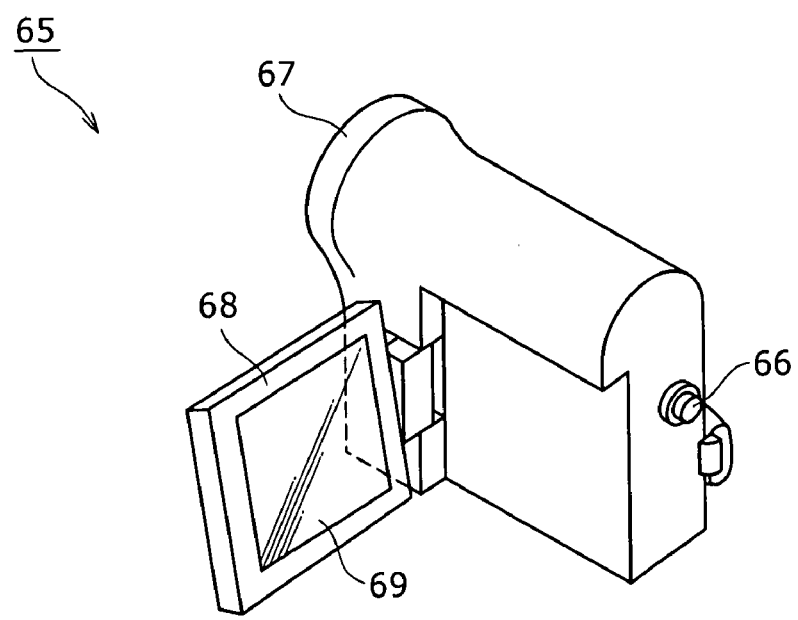
FIG. 6 is a perspective view showing another example of the display device of FIGS. 1A and 1B, different from the examples of FIGS. 3 to 5.

FIG. 6 is a perspective view showing a video camera. A trigger switch 66 is provided on the backside of this video camera 65, and a lens 67 is provided on the front side thereof. Furthermore, a door unit 68 is openably and closably provided on the left side, and a display part 69 is provided inside this door unit 68. In this video camera 65, the configuration according to the embodiment of the present invention is applied to this display part 69.

Figure 7A:
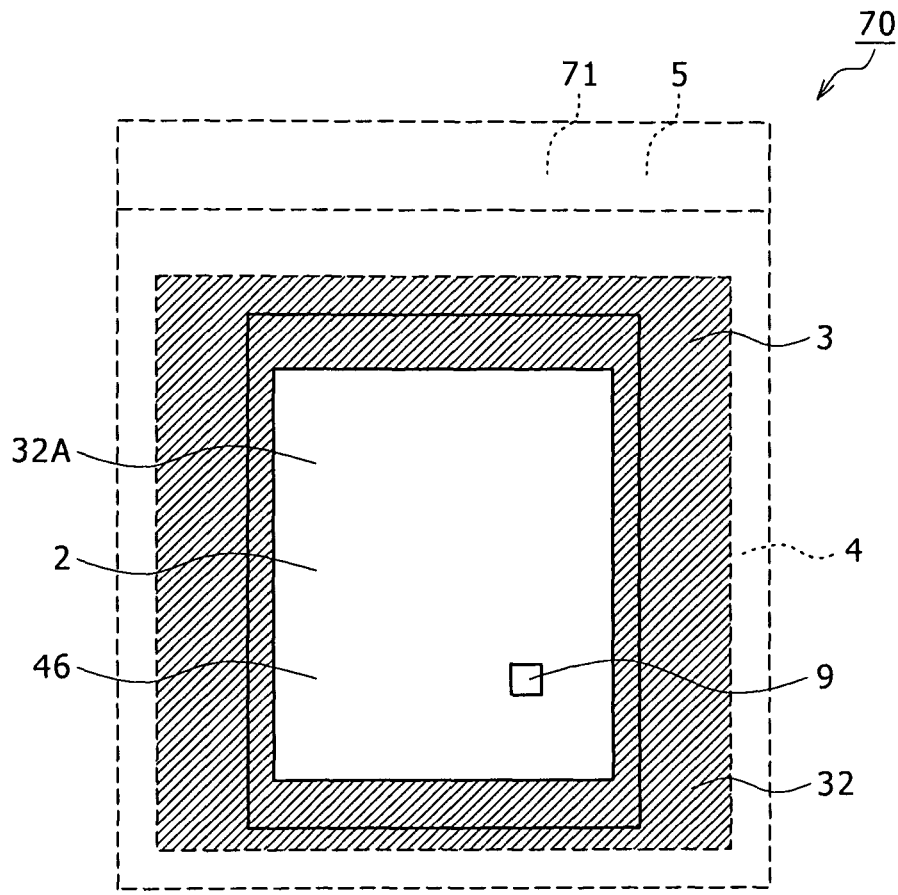
FIGS. 7A and 7B are plan view and sectional view of a liquid crystal display panel applied to the display device of FIGS. 1A and 1B.
Figure 7B:
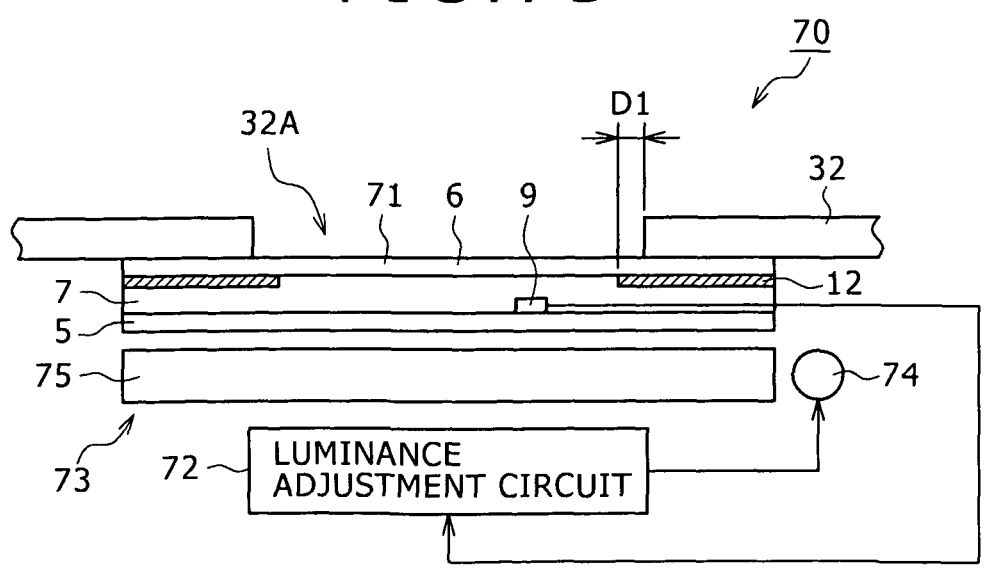
Figure 23A:
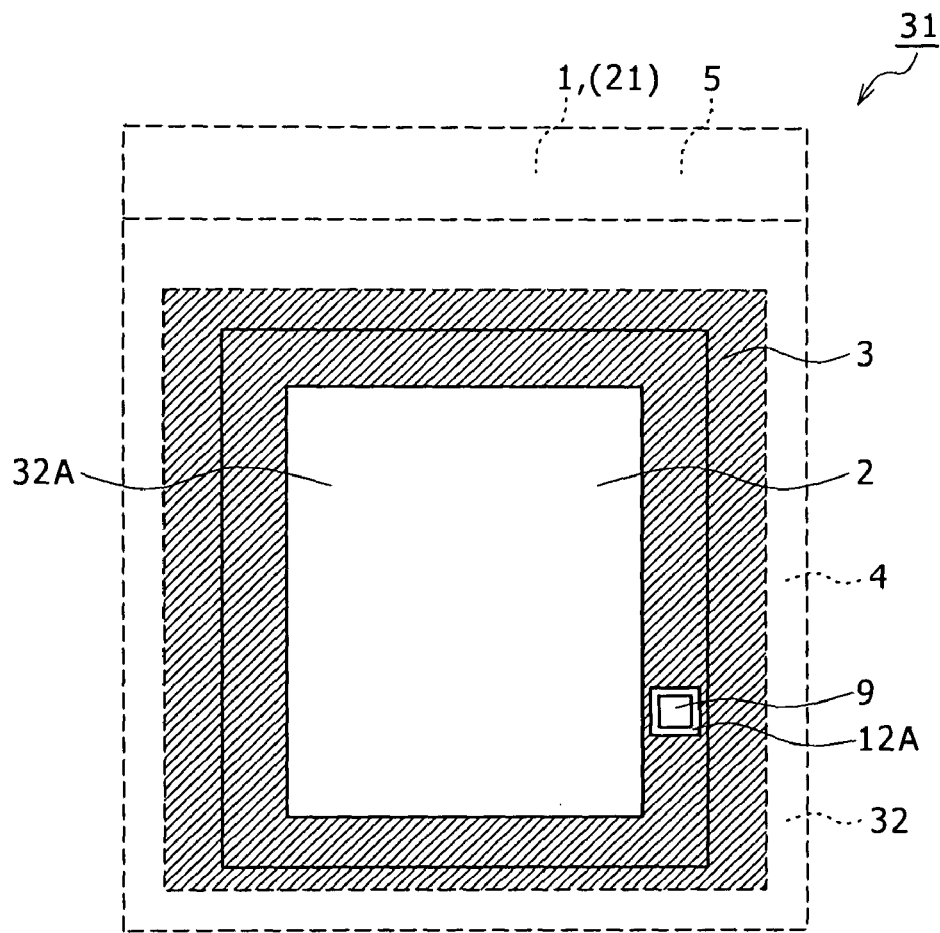
FIGS. 23A and 23B are plan view and sectional view for explaining the layout of a liquid crystal display panel.
Figure 23B:
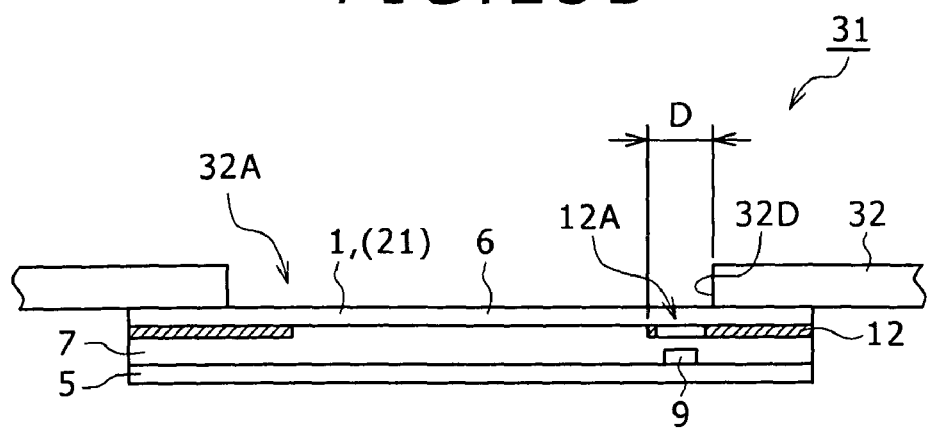

FIGS. 7A and 7B are plan view and sectional view showing, based on comparison with FIGS. 23A and 23B, the configuration of a display device applied to the above-described electronic apparatus. In the following, the configuration of the main display part 46 in the cellular phone described above with FIGS. 2A and 2B will be described. However, the sub-display part 45 and the display parts in other electronic apparatus are also configured similarly to the display part 46. In FIGS. 7A and 7B, the same components as those in the display device 31 described above with FIGS. 23A and 23B are given the same numerals, and the description thereof is omitted.

In this display device 70, a liquid crystal display panel 71 is provided for the display part 46. The liquid crystal display panel 71 has the same configuration as that of the liquid crystal display panel 1 described above with FIGS. 21A and 21B, except that the ambient light sensor 9 is provided in the effective pixel area 2. The aperture 32A of the case 32 is so formed as to have a size smaller than that in the liquid crystal display panel 1, corresponding to the provision of the ambient light sensor 9 not in the light-blocking area 3 but in the effective pixel area 2. Due to this feature, the width D1 of the black frame surrounding the effective pixel area 2 is smaller in the display device 70.

This display device 70 controls the light-emission luminance of a primary light source 74 provided in a backlight device 73 by a luminance adjustment circuit 72 based on the result of light amount detection by the ambient light sensor 9 provided in the effective pixel area 2, to thereby control the luminance of the display screen of the display part 46. In FIG. 7B, numeral 75 denotes a light guide, and the primary light source 74 is formed of e.g. a light emitting diode or a cold cathode tube. In the backlight device 73, illumination light emitted from this primary light source 74 is incident on the light guide 75 via an end surface of the light guide 75 and travels inside the light guide 75. This light is output from the output surface of the light guide 75, facing the liquid crystal display panel 71.

Although FIGS. 7A and 7B show a so-called edge-light type backlight device, the configuration according to the embodiment of the present invention can be widely applied to a so-called direct type backlight device and so on. If a direct type backlight device is used and the primary light source is formed of plural light-emitting elements, the ambient light sensor 9 may be provided for each light-emitting element or per a predetermined number of light-emitting elements, and the light-emission amount may be adjusted for each light-emitting element or for each group of the predetermined number of light-emitting elements.

In FIGS. 7A and 7B, one ambient light sensor 9 is provided in the effective pixel area 2. However, in the practical display device 70, the ambient light sensor 9 is provided at each of positions separated from each other in the effective pixel area 2 and thus the plural ambient light sensors 9 are provided in the effective pixel area 2. The plural ambient light sensors 9 may be collectively disposed in the specific area instead of being disposed at positions separated from each other. The display device 70 adds the output signals of these plural ambient light sensors 9 to each other and processes the resulting signal. This allows enhancement in the SN (signal to noise) ratio and the signal level of the result of ambient light reception. In this case, the output signals of the plural ambient light sensors 9 may be simply added to each other and processed. Alternatively, the output signals may be subjected to weighted addition with weighting factors dependent on the positions of the ambient light sensors 9, and then processed. The number of provided ambient light sensors 9 may be one if the SN ratio and signal level that are sufficiently high in practical use can be ensured for example.

Figures 1A, 1B:
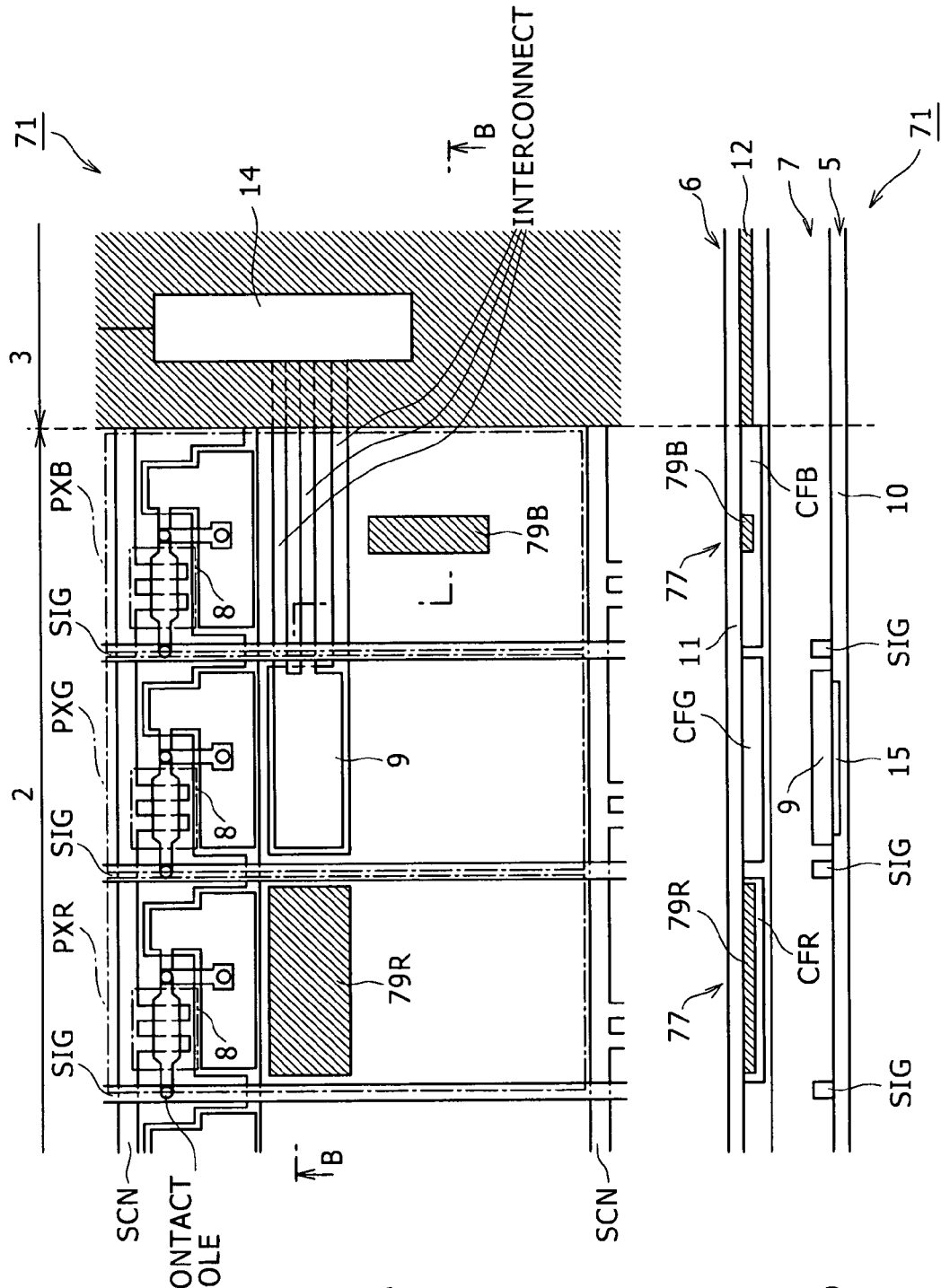
FIGS. 1A and 1B is plan view and sectional view showing the detailed configuration of a liquid crystal display device according to a first embodiment of the present invention.

(1-2) Hue Correction Mechanism (FIGS. 1A and 1B)

If the ambient light sensor 9 is provided in the effective pixel area 2 as shown in FIGS. 7A and 7B, the aperture area (aperture ratio) is lowered and the luminance value becomes insufficient in the sub-pixel in which the ambient light sensor 9 is disposed. As a result, the hue changes in one pixel for color images, including this sub-pixel, so that the image quality is deteriorated in this liquid crystal display panel 71. To address this problem, the liquid crystal display device 70 of this embodiment is provided with a hue correction mechanism that corrects the local hue change due to the provision of the ambient light sensor 9.

FIGS. 1A and 1B are plan view and sectional view for explaining, based on comparison with FIGS. 22A and 22B, the hue correction mechanism applied to the liquid crystal display device 70 of this embodiment. In this embodiment, the ambient light sensor 9 is disposed in the green sub-pixel PXG and receives ambient light via the green color filter CFG disposed for this green sub-pixel PXG. The spectral sensitivity of the human is characteristically more excellent to green than to red and blue. For this reason, this liquid crystal display device 70 receives ambient light in the wavelength band to which the spectral sensitivity of the human is the most excellent, to thereby enhance the accuracy of the luminance adjustment. The ambient light sensor may be disposed in the red and/or blue sub-pixels instead of the green sub-pixel or in addition to the green sub-pixel, as long as the luminance adjustment can be carried out with accuracy that is sufficiently high in practical use.

Thus, in this liquid crystal display device 70, the luminance value of the green sub-pixel PXG in which the ambient light sensor 9 is disposed is lowered compared with the red and blue sub-pixels PXR and PXB that form one pixel for color images together with this green sub-pixel PXG, so that the image quality is deteriorated. To address this problem, in this liquid crystal display device 70, an aperture limiting mechanism 77 for limiting the aperture is provided in these red and blue sub-pixels PXR and PXB, and the hue correction mechanism is obtained by this aperture limiting mechanism 77.

More specifically, in this embodiment, light blockers 79R and 79B are formed in the red and blue sub-pixels PXR and PXB by using the light-blocking film 12 for forming the light-blocking area 3. By the light blockers 79R and 79B, the aperture area (aperture ratio) of the red and blue sub-pixels PXR and PXB is set identical to that of the green sub-pixel PXG in which the ambient light sensor 9 is disposed. Thus, the aperture limiting mechanism 77 is obtained by the light blockers 79R and 79B in this embodiment.

Specifically, in the example of FIGS. 1A and 1B, the light blocker 79R for the red sub-pixel PXR is so formed as to have the area equal to the area of the aperture lost in the green sub-pixel PXG due to the provision of the ambient light sensor 9 therein. Furthermore, the light blocker 79B for the blue sub-pixel PXB is so formed as to have the area equal to the area obtained by subtracting the area of the aperture lost in this blue sub-pixel PXB due to the provision of the interconnect to the ambient light sensor 9 therein from the area of the aperture lost in the green sub-pixel PXG due to the provision of the ambient light sensor 9 therein.

Although the light blockers 79R and 79B locally block output light from the liquid crystal display panel, a configuration to block and limit light passage through these red and blue sub-pixels PXR and PXB is sufficient, specifically. Thus, various configurations to locally block output light from the liquid crystal display panel can be widely used. One example of these configurations employs, instead of the fabrication of the light blockers 79R and 79B by use of the light-blocking film 12, local stopping of driving of the pixel electrodes in a normally-black liquid crystal display panel to thereby achieve the same effect as that by the light blockers 79R and 79B.

(2) Operation of Embodiment

In this display device 70 (FIGS. 7A and 7B) having the above-described configuration, the primary light source 74 of the backlight device 73 is driven by the luminance adjustment circuit 72, and light emitted from this primary light source 74 is supplied to the liquid crystal display panel 71 via the light guide 75. The grayscales of the respective pixels are set depending on image data and so on in the liquid crystal display panel 71, and the light supplied from the backlight device 73 to the respective pixels is spatially modulated depending on the grayscales set for the respective pixels, so that the desired image can be displayed.

In the display device 70, the amount of ambient light incident on this liquid crystal display panel 71 is detected by the ambient light sensor 9, and the detection result is processed by the sensor circuit 14 and then is input to the luminance adjustment circuit 72. The luminance adjustment circuit 72 operates based on the result of the light amount detection by the ambient light sensor 9. Specifically, if the ambient light amount becomes large and thus it becomes difficult to view the display screen formed in the effective pixel area 2, the light-emission luminance of the primary light source 74 is increased in proportion to the ambient light amount and thus the luminance of the display screen is increased, for example. This makes it possible to ensure sufficient visibility even when the ambient light amount has become large. In addition, the ambient light sensor 9 can prevent the primary light source 74 from emitting light with the unnecessarily-large light amount, and thus the power consumption can be reduced.

However, if the ambient light sensor 9 is disposed in the light-blocking area 3 as with the related-art display devices (see FIGS. 21A and 21B and 23A and 23B), it is needed to increase the size of the aperture 32A of the case 32 in order to prevent the case 32 from blocking the ambient light sensor 9. As a result, the black frame formed around the effective pixel area 2 due to the light-blocking area 3 has a large width, which lowers the quality of the display screen. If the size of the aperture 32A is decreased to reduce the width of this frame, ambient light incident on the ambient light sensor 9 is blocked, which leads to failure in the accurate detection of the ambient light amount. This results in difficulty in accurate luminance adjustment of the display device. Furthermore, high assembly accuracy is also required, which precludes easy fabrication of the display device.

To address this problem, the ambient light sensor 9 is provided in the effective pixel area 2 instead of the light-blocking area 3 in this embodiment (FIGS. 7A and 7B). If the ambient light sensor 9 is provided in the effective pixel area 2 instead of the light-blocking area 3, correspondingly the size of the aperture 32A of the case 32 can be decreased and the width of the black frame in the display screen can be decreased, which allows enhancement in the quality of the display screen. Although the width of the black frame is decreased, the incidence of ambient light on the ambient light sensor 9 is not hindered, which allows accurate detection of the ambient light amount. Therefore, the accuracy of the luminance adjustment can be improved compared with the related arts, without enhancement in the assembly accuracy. Due to this feature, this embodiment can carry out easier luminance adjustment with higher accuracy compared with the related arts.

Furthermore, in this embodiment, the ambient light sensor 9 is provided in the green sub-pixel PXG provided in the effective pixel area 2 (FIGS. 1A and 1B), and the ambient light sensor 9 receives ambient light via the green color filter CFG. The wavelength band of the green sub-pixel PXG is the most excellent in the sensitivity of the human's visual characteristics. Thus, the display device 70 can carry out the luminance adjustment in accordance with the human's visual characteristics. This feature can also enhance the accuracy of the luminance adjustment compared with the related arts.

In the provision of the ambient light sensor 9 in the effective pixel area 2 in this manner, the flexibility in the provision position of the ambient light sensor 9 is greatly higher than that in the provision of the ambient light sensor 9 in the light-blocking area 3. Due to this feature, ambient light can be surely detected with avoidance of various kinds of obstruction dependent on the position of the ambient light sensor 9, such as scattered light from the case and light blocking due to user's operation.

If the ambient light sensor 9 is disposed in the effective pixel area 2 in this manner, this ambient light sensor 9 will be possibly visually recognized. However, through use of a scheme of providing the plural ambient light sensors 9 and executing addition processing for the output signals of these plural ambient light sensors 9 to thereby enhance the SN ratio and the signal level, the ambient light sensors 9 with such a small size as to be difficult to visually recognize on the display screen can be fabricated so that they can be prevented from being visually recognized.

However, if the ambient light sensor 9 is disposed in the green sub-pixel PXG provided in the effective pixel area 2 in this manner, the aperture area (aperture ratio) of the sub-pixel PXG is lowered and the luminance value thereof is decreased in proportion to the decrease in the aperture area (aperture ratio). This results in hue change in one pixel for color images, including the green sub-pixel PXG in which this ambient light sensor 9 is disposed. Although this hue change is inconspicuous in displaying of a blackish image, it is conspicuous in displaying of a whitish image and thus deteriorates the image quality.

To address this problem, in this embodiment, the liquid crystal display device 70 is provided with the hue correction mechanism, and the hue change due to the aperture ratio decrease accompanying the provision of the ambient light sensor 9 is corrected. This feature allows the liquid crystal display device 70 to prevent the local hue change to thereby effectively avoid image quality deterioration, although the ambient light sensor 9 for detection of the ambient light amount is provided in the effective pixel area.

More specifically, in this embodiment, the aperture limiting mechanism 77 is provided in the red and blue sub-pixels PXR and PXB that form one pixel for color images together with the green sub-pixel PXG in which the ambient light sensor 9 is disposed. By this aperture limiting mechanism 77, the aperture area of these red and blue sub-pixels PXR and PXB is set identical to that of the sub-pixel PXG in which the ambient light sensor 9 is disposed. This allows the liquid crystal display device 70 to prevent local hue change with the simple configuration, in which merely the aperture limiting mechanism 77 is provided in the other sub-pixels corresponding to the sub-pixel in which the ambient light sensor 9 is provided.

Moreover, in this embodiment, the light blockers 79R and 79B are fabricated in these red and blue sub-pixels PXR and PXB by using the light-blocking film 12 that serves as the light-blocking area 3. The aperture limiting mechanism 77 is provided by the light blockers 79R and 79B. Thus, the aperture limiting mechanism 77 can be provided in the liquid crystal display device 70 by merely changing the mask used for the formation of the light-blocking area 3, and therefore local hue change can be prevented with the simple configuration.

(3) Advantageous Effects of Embodiment

In the above-described configuration, hue change due to an aperture ratio decrease accompanying the provision of the ambient light sensor is corrected by using a hue correction mechanism. This allows effective avoidance of image quality deterioration although the ambient light sensor for detection of the ambient light amount is provided in the effective pixel area.

Furthermore, the aperture limiting mechanism is provided in the other sub-pixels that form one pixel for color images together with the sub-pixel in which the ambient light sensor is disposed, and the hue correction mechanism is obtained by this aperture limiting mechanism. This makes it possible to prevent local hue change with the simple configuration, in which merely the aperture limiting mechanism is provided in the other sub-pixels corresponding to the sub-pixel in which the ambient light sensor is provided.

Moreover, the light blocker is fabricated by the light-blocking film serving as the light-blocking area, to thereby form this aperture limiting mechanism. Thus, the aperture limiting mechanism can be provided through the change of the mask used for the fabrication of the light-blocking area, and therefore local hue change can be prevented with the simple configuration.

Second Embodiment

Figure 8A:
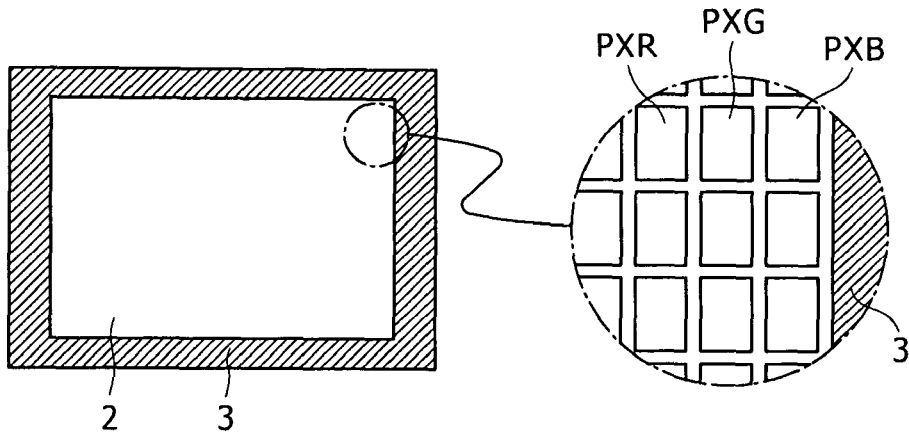
FIGS. 8A to 8C are plan views showing a liquid crystal display panel applied to a liquid crystal display device according to a second embodiment of the present invention.

In a liquid crystal display device according to a second embodiment of the present invention, the ambient light sensors are disposed in green sub-pixels PXG on the outermost periphery of the effective pixel area. If no ambient light sensor 9 is disposed as shown in FIG. 8A, the aperture ratios of all of the sub-pixels PXR, PXG, and PXB are set substantially the same. Therefore, e.g. in displaying of white on the entire screen, a uniform white screen can be obtained.

Figure 8B:
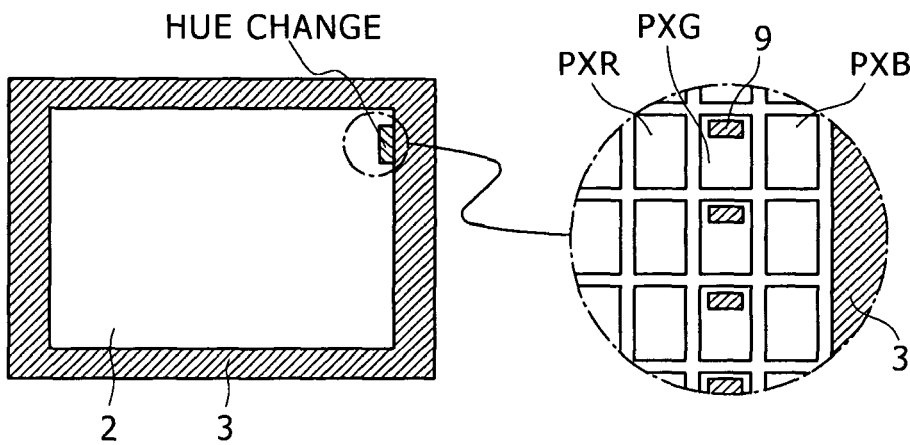

If the ambient light sensor 9 is disposed in the effective pixel area, a sense of discomfort due to the provision of the ambient light sensor 9 is smaller when the ambient light sensor 9 is disposed in peripheral part of the screen than when it is disposed in center part of the screen. Therefore, in this embodiment, as shown in FIG. 8B, the ambient light sensor 9 is disposed in each of the plural green sub-pixels PXG that are the closest to the sensor circuit and continuous along the vertical direction of the outermost periphery of the effective pixel area. If the ambient light sensors 9 are disposed on the outermost periphery of the effective pixel area in this manner, the hue is changed in the pixels in which the ambient light sensor 9 is disposed.

Figure 8C:
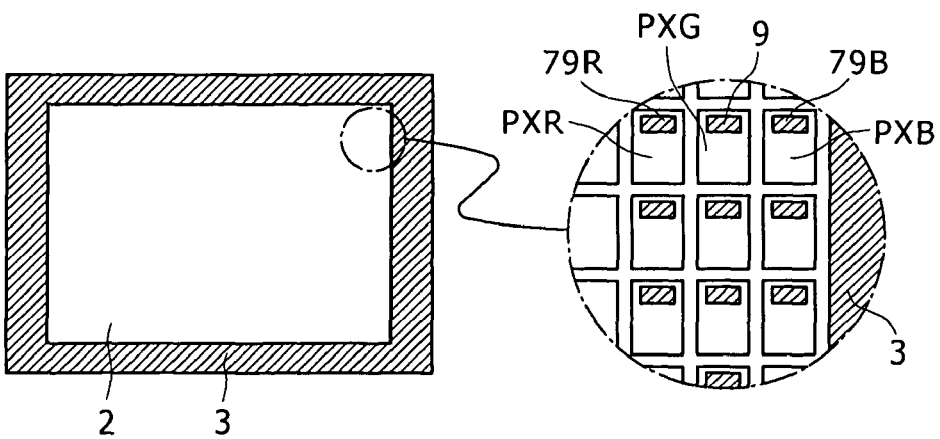

To address this problem, in this embodiment, as shown in FIG. 8C, the light blockers 79R and 79B are provided in red and blue sub-pixels PXR and PXB, respectively, corresponding to the plural green sub-pixels PXG that have the ambient light sensors 9 and are continuous along the vertical direction. Also in this embodiment, the ambient light sensors may be disposed in the red and/or blue sub-pixels instead of the green sub-pixels or in addition to the green sub-pixels and the light blockers may be provided in matching with this provision of the ambient light sensors, as long as the luminance adjustment can be carried out with accuracy that is sufficiently high in practical use.

If the ambient light sensors are provided in the green sub-pixels on the outermost periphery of the effective pixel area and the hue correction mechanism is provided by fabricating the light blockers in matching with this provision of the ambient light sensor like this embodiment, the provision of the ambient light sensors can be made more inconspicuous and the same advantage as that of the first embodiment can be achieved.

Third Embodiment

In the configuration of the second embodiment, the aperture ratio is lowered in the pixels in which the ambient light sensors and the light blockers are provided and the luminance value is lowered in these pixels, although hue change due to the provision of the ambient light sensors can be prevented. As a result, in the configuration of the second embodiment, if a white frame image with a small width is displayed on the outermost periphery as shown in FIG. 9 for example, the lowering of the luminance value of the pixels having the ambient light sensors is perceived, which gives a sense of discomfort to the user.

To address this problem, a third embodiment of the present invention is configured as shown in FIG. 10 on the premise of the configuration of the second embodiment. Specifically, light blockers 80R, 80G, and 80B are provided in the red, green, and blue sub-pixels that are on the outermost periphery of the effective pixel area and to which the ambient light sensor 9 and the light blockers 79R and 79B are not allocated. These dummy light blockers 80R, 80G, and 80B are so provided by using the light-blocking film 12 as with the light blockers 79R and 79B as to have the same aperture area (aperture ratio) as that of the pixels to which the ambient light sensors 9 and the light blockers 79R and 79B are allocated.

In this embodiment, due to these light blockers 80R, 80G, and 80B, the lowering of the luminance value in the pixels in which the ambient light sensors are disposed is inconspicuous and a sense of discomfort felt by a user is small even when a white frame image with a small width is displayed on the outermost periphery.

By locally allocating the ambient light sensors and the light blockers to pixels on the outermost periphery of the effective pixel area and providing the light blockers in the pixels that are on the outermost periphery of the effective pixel area and to which the ambient light sensor and the light blockers are not allocated like this embodiment, giving a sense of discomfort to a user can be further prevented and the same advantage as that of the second embodiment can be achieved.

Fourth Embodiment

Figure 11:
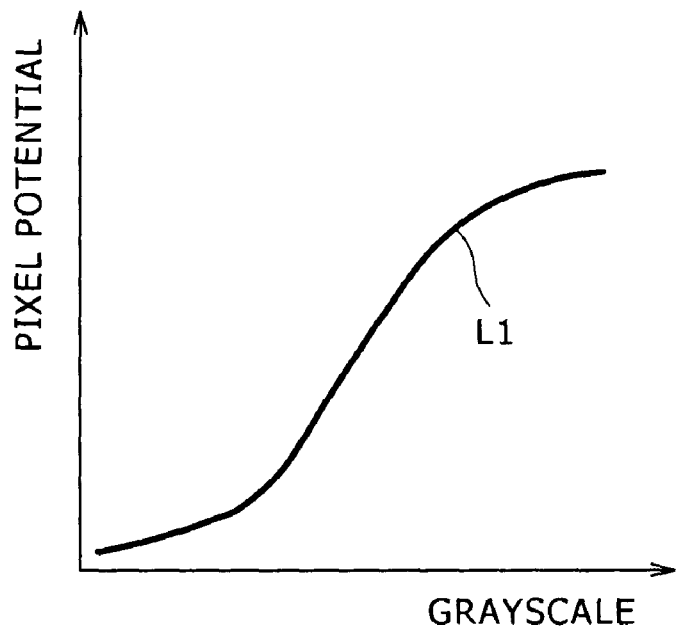
FIG. 11 is a characteristic curve diagram showing the relationship between the grayscale and the pixel potential in a normal pixel.
Figure 12:
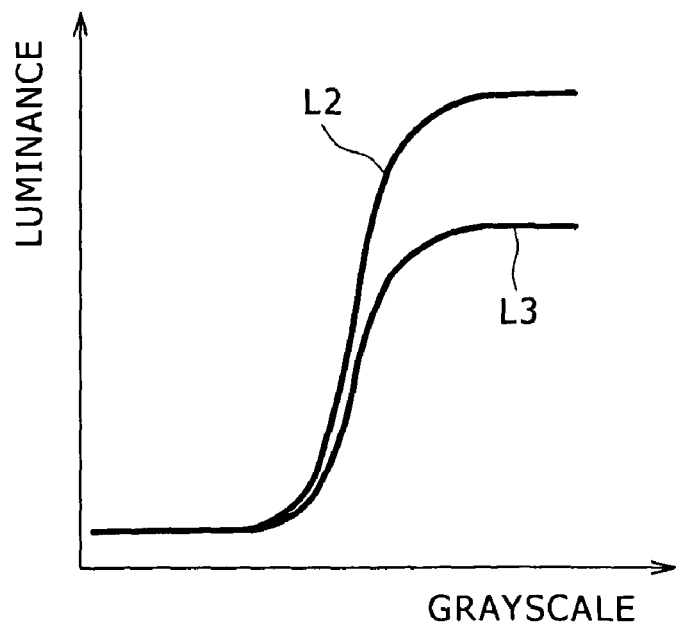
FIG. 12 is a characteristic curve diagram for explaining the lowering of the luminance value due to provision of an ambient light sensor.

In a liquid crystal display device, the pixel voltage as the voltage of the pixel electrode, which sandwiches a liquid crystal together with the common electrode, is set depending on the grayscale indicated by image data as shown by symbol L1 in FIG. 11. Thereby, the luminance value dependent on the grayscale is ensured as shown by symbol L2 in FIG. 12. However, if the aperture area is decreased due to the provision of the ambient light sensor 9, luminance value lowering occurs corresponding to the decrease in the aperture area as shown in symbol L3 in this liquid crystal display device. As a result, the hue changes locally in the pixel in which the ambient light sensor 9 is disposed as described above.

Figure 13:
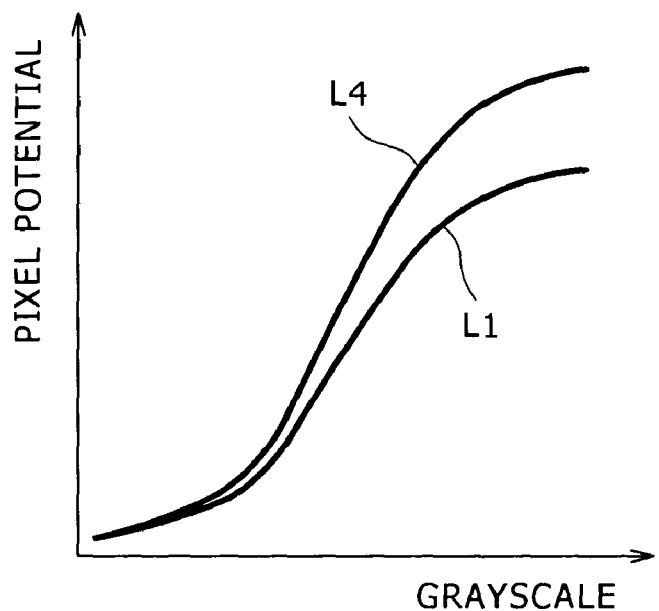
FIG. 13 is a characteristic curve diagram for explaining correction against the lowering of the luminance value due to the provision of the ambient light sensor.
Figure 14:
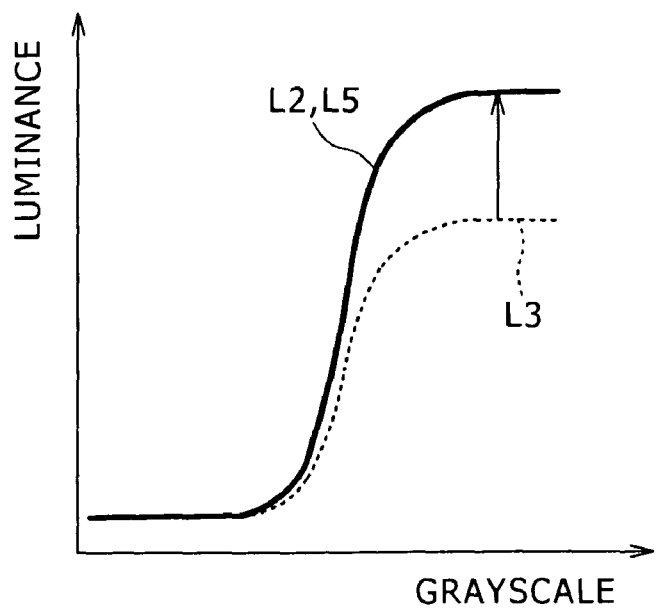
FIG. 14 is a characteristic curve diagram for explaining the relationship between the correction of the luminance value in FIG. 13 and the grayscale.

To address this problem, in a fourth embodiment of the present invention, as shown in FIG. 13 based on comparison with FIG. 11, the pixel voltage for the sub-pixel in which the ambient light sensor 9 is disposed is increased compared with the other sub-pixels as shown by symbol L4 based on comparison with the characteristic curve indicated by symbol L1. Due to this feature, in this embodiment, as shown by symbol L5 in FIG. 14 based on comparison with FIG. 12, the luminance value lowered due to the provision of the ambient light sensor 9 is increased, so that the same luminance value as that of the other sub-pixels, in which the ambient light sensor 9 is not disposed, is ensured. Based on this feature, in the liquid crystal display device of this embodiment, the hue correction mechanism is achieved through the increase in the amplitude of the pixel voltage, to thereby prevent local hue change and effectively avoid image quality deterioration.

Figure 15:
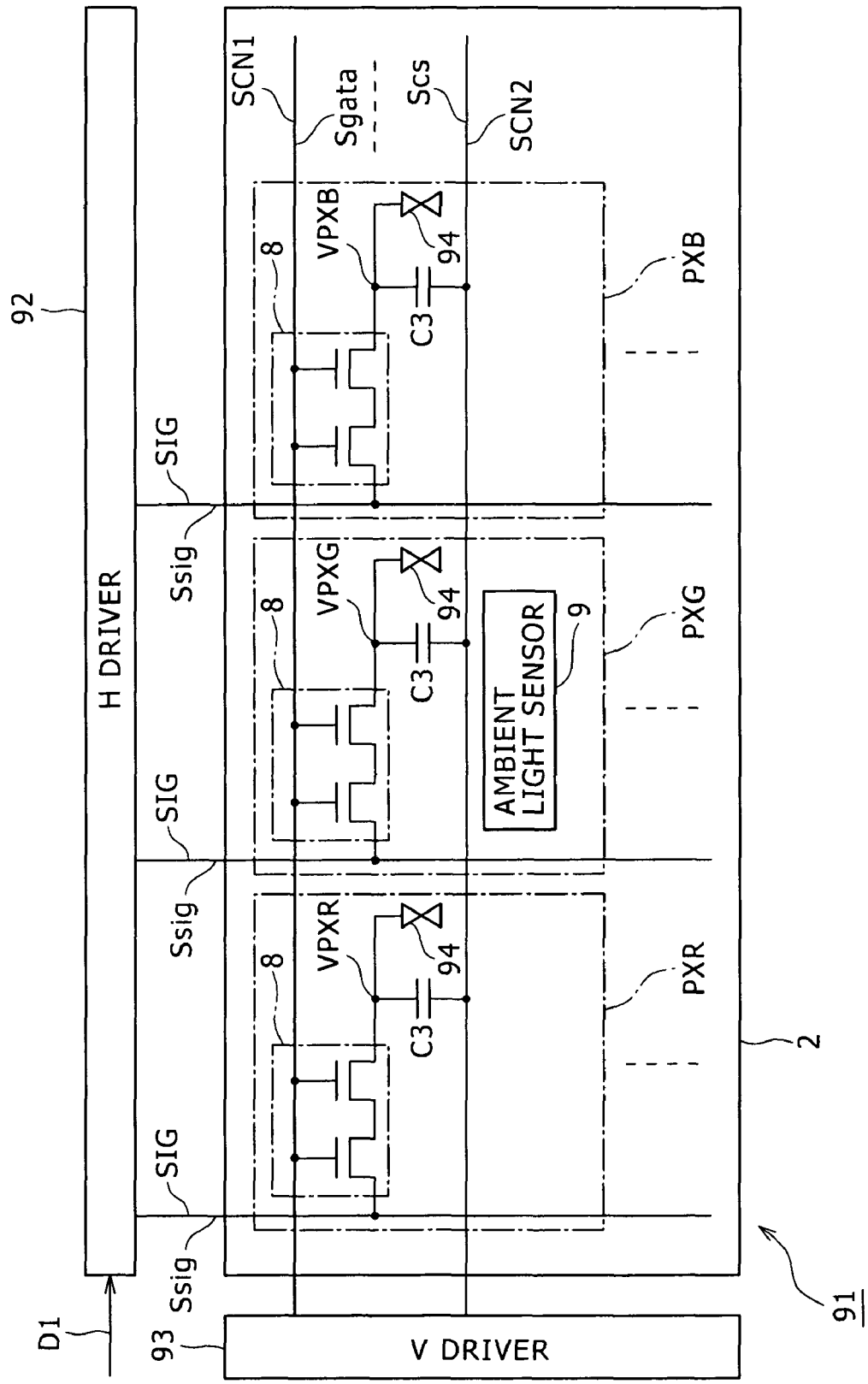
FIG. 15 is a connection diagram showing a liquid crystal display panel applied to a liquid crystal display device according to a fourth embodiment of the present invention.

In this embodiment, the pixel voltage is increased by utilizing gate coupling by a hold capacitor Cs. FIG. 15 is a block diagram showing the liquid crystal display device according to this embodiment. In this display device 91, an H driver 92 sequentially latches image data D1 input e.g. in the raster scan order to thereby sort this image data D1 for the respective signal lines SIG. The H driver 92 executes digital-analog conversion processing for each of the sorted image data D1, and outputs a drive signal Ssig to the respective signal lines SIG.

A V driver 93 outputs a gate signal Sgata to a scan line SCN1 in matching with the driving of the signal lines SIG by this H driver 92, to thereby control the on/off-state of transistors 8 provided in the respective pixels PXR, PXG, and PXB. In addition, the V driver 93 outputs a drive signal Scs of the hold capacitor Cs to a scan line SCN2.

For the pixels PXR, PXG, and PXB, the pixel electrode of a liquid crystal cell 94 and one terminal of the hold capacitor Cs are connected to the signal line SIG via the transistor 8, which is turned on and off by the gate signal Sgata. In addition, the other terminal of the hold capacitor Cs is connected to the scan line SCN2.

Figure 16A:
FIGS. 16A to 16D are time charts for explaining the liquid crystal display panel of FIG. 15.
Figure 16B:
Figure 16C:
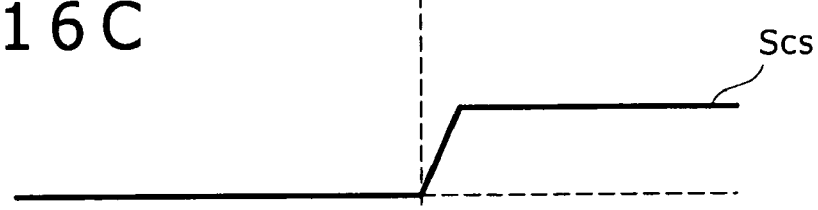
Figure 16D:
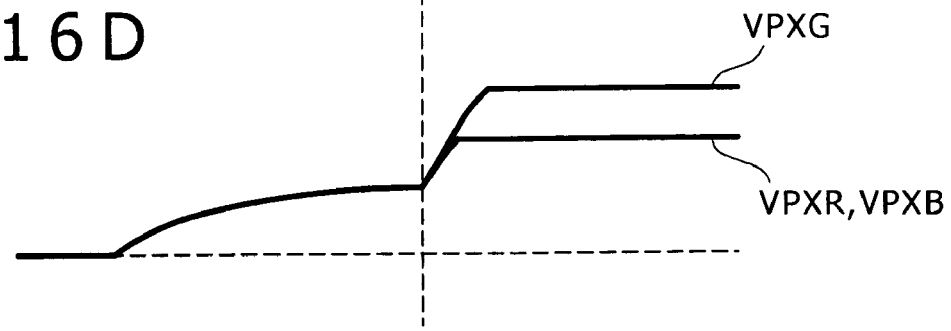
Figure 18A:
FIGS. 18A to 18D are time charts for explaining the liquid crystal display panel of FIG. 17.
Figure 18B:
Figure 18C:
Figure 18D:
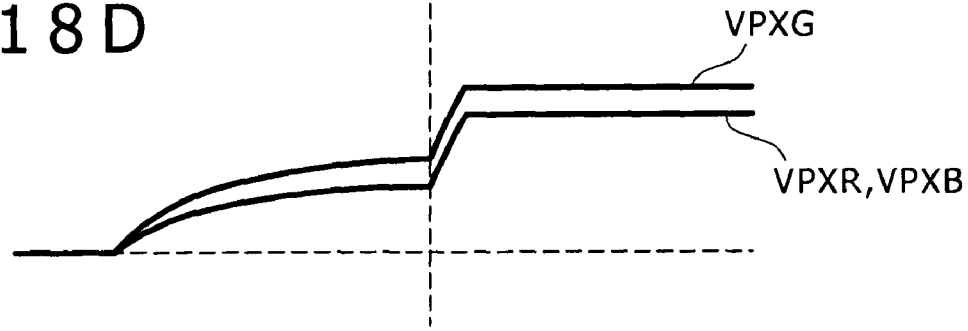

Based on this configuration, in the display device 91, the transistors 8 are turned on by the gate signal Sgata, so that the pixel voltages VPXR, VPXG, and VPXB of the corresponding sub-pixels PXR, PXG, and PXB are set to the voltage of the signal line SIG as shown in FIGS. 16A, 16B, and 16D. Subsequently, the drive signal Scs of the hold capacitor Cs is switched to the high level, so that the pixel voltages VPXR, VPXG, and VPXB of the sub-pixels PXR, PXG, and PXB are set based on gate coupling by the hold capacitor Cs (FIGS. 16C and 16D).

In this liquid crystal display device 91, based on the setting of the electrode area of the hold capacitor Cs, the capacity of the hold capacitor Cs of the sub-pixel PXG in which the ambient light sensor 9 is disposed is set higher than that of the hold capacitors Cs of the other sub-pixels. Due to this feature, in the display device 91, the amplitude of the pixel voltage VPXG of the sub-pixel PXG in which the ambient light sensor 9 is disposed is increased compared with the pixel voltages VPXR and VPXB of the other sub-pixels PXR and PXB, to thereby correct the lowering of the luminance value due to an aperture ratio decrease accompanying the provision of the ambient light sensor 9. Thus, in this embodiment, the hue correction mechanism is achieved through the increase in the capacity of the hold capacitor Cs and hue change due to an aperture ratio decrease accompanying the provision of the ambient light sensor is corrected.

According to this embodiment, also when the hue correction mechanism is obtained through increase in the amplitude of the pixel voltage, hue change due to an aperture ratio decrease accompanying the provision of the ambient light sensor can be prevented. Furthermore, in this case, the lowering of the luminance value does not occur in one pixel for color images, including the sub-pixel in which the ambient light sensor is disposed. This allows image displaying with higher image quality.

More specifically, by obtaining the hue correction mechanism through increase in the capacity of the hold capacitor Cs, hue change due to an aperture ratio decrease accompanying the provision of the ambient light sensor is prevented with the simple configuration, so that images can be displayed with high image quality.

Fifth Embodiment

FIG. 17 is a block diagram showing a liquid crystal display device according to a fifth embodiment of the present invention. In this display device 96, the hue correction mechanism is achieved through increase in the amplitude of the drive signal output to the signal line SIG instead of increase in the capacity of the hold capacitor Cs, described above for the fourth embodiment. The same components in the display device 96 of FIG. 17 as those in the display device 91 of FIG. 15 are given the same numerals, and the overlapping description thereof is omitted.

In this display device 96, a memory 97 serves as a buffer memory for the image data D1. The memory 97 stores the image data D1 sequentially input under address control by an address counter 98 and sequentially outputs the stored image data D1. An address decoder 99 decodes the addresses in the memory 97 controlled by this address counter 98, to thereby detect the timing at which the image data D1 to the sub-pixel PXG in which the ambient light sensor 9 is disposed is output from the memory 97. Based on the timing detected by this address decoder 99, a selection circuit 100 switches and outputs reference voltages Ref1 and Ref2 for digital-analog conversion processing.

An H driver 101 sequentially latches the image data D1 output from the memory 97 by latch circuits (R) 102, and sorts the image data D1 toward the corresponding signal lines SIG. The H driver 101 divides by resistors the reference voltage Ref1 or Ref2 output from the selection circuit 100 in a reference voltage generator 103, to thereby generate reference voltages V0 to V63 each corresponding to a respective one of the grayscales indicated by the image data D1. The H driver 101 selects one of the reference voltages V0 to V63 in each selector 104 depending on the image data D1 sorted toward the respective signal lines SIG, to thereby subject the respective image data D1 to digital-analog conversion processing. The H driver 101 outputs, to the respective signal lines SIG, output signals SsigR, SsigG, and SsigB of the selectors 104.

Based on this configuration, as shown in FIGS. 18A to 18D, in the display device 96, the voltages of the pixel electrodes of the sub-pixels PXR, PXG, and PXB are set to the voltages corresponding to the output signals SsigR, SsigG, and SsigB of the selectors 104 under control by the gate signal Sgata. Subsequently, the voltages of the pixel electrodes of the sub-pixels PXR, PXG, and PXB are set to the predetermined pixel voltages VPXR, VPXG, and VPXB based on gate coupling by the hold capacitor Cs (FIGS. 18A to 18D).

In the display device 96, through the switching between the reference voltages Ref1 and Ref2 in the selection circuit 100, the reference voltage for digital-analog conversion processing is switched between one for the sub-pixel PXG in which the ambient light sensor 9 is disposed and one for the sub-pixels PXR and PXB in which the ambient light sensor 9 is not disposed. For the sub-pixel PXG in which the ambient light sensor 9 is disposed, the drive signal SsigG of the signal line SIG is so designed as to have amplitude larger than that of the drive signals for the sub-pixels PXR and PXB in which the ambient light sensor 9 is not disposed.

Due to this feature, in the display device 96, the amplitude of the pixel voltage VPXG of the sub-pixel in which the ambient light sensor 9 is disposed is increased compared with the pixel voltages VPXR and VPXB of the other sub-pixels, to thereby correct the lowering of the luminance value due to an aperture ratio decrease accompanying the provision of the ambient light sensor 9. Thus, in this embodiment, the hue correction mechanism is achieved through the increase in the amplitude of the drive signal of the signal line, specifically through the switching of the reference voltage for digital-analog conversion processing, and hue change due to an aperture ratio decrease accompanying the provision of the ambient light sensor is corrected.

According to this embodiment, also when the hue correction mechanism is obtained through increase in the amplitude of the drive signal of the signal line, hue change due to an aperture ratio decrease accompanying the provision of the ambient light sensor can be prevented. Furthermore, in this case, the lowering of the luminance value does not occur in one pixel for color images, including the sub-pixel in which the ambient light sensor is disposed. This allows image displaying with higher image quality.

More specifically, by obtaining the hue correction mechanism through switching of the reference voltage for digital-analog conversion processing, hue change due to an aperture ratio decrease accompanying the provision of the ambient light sensor is prevented with the simple configuration, so that images can be displayed with high image quality.

Sixth Embodiment

Figure 19:
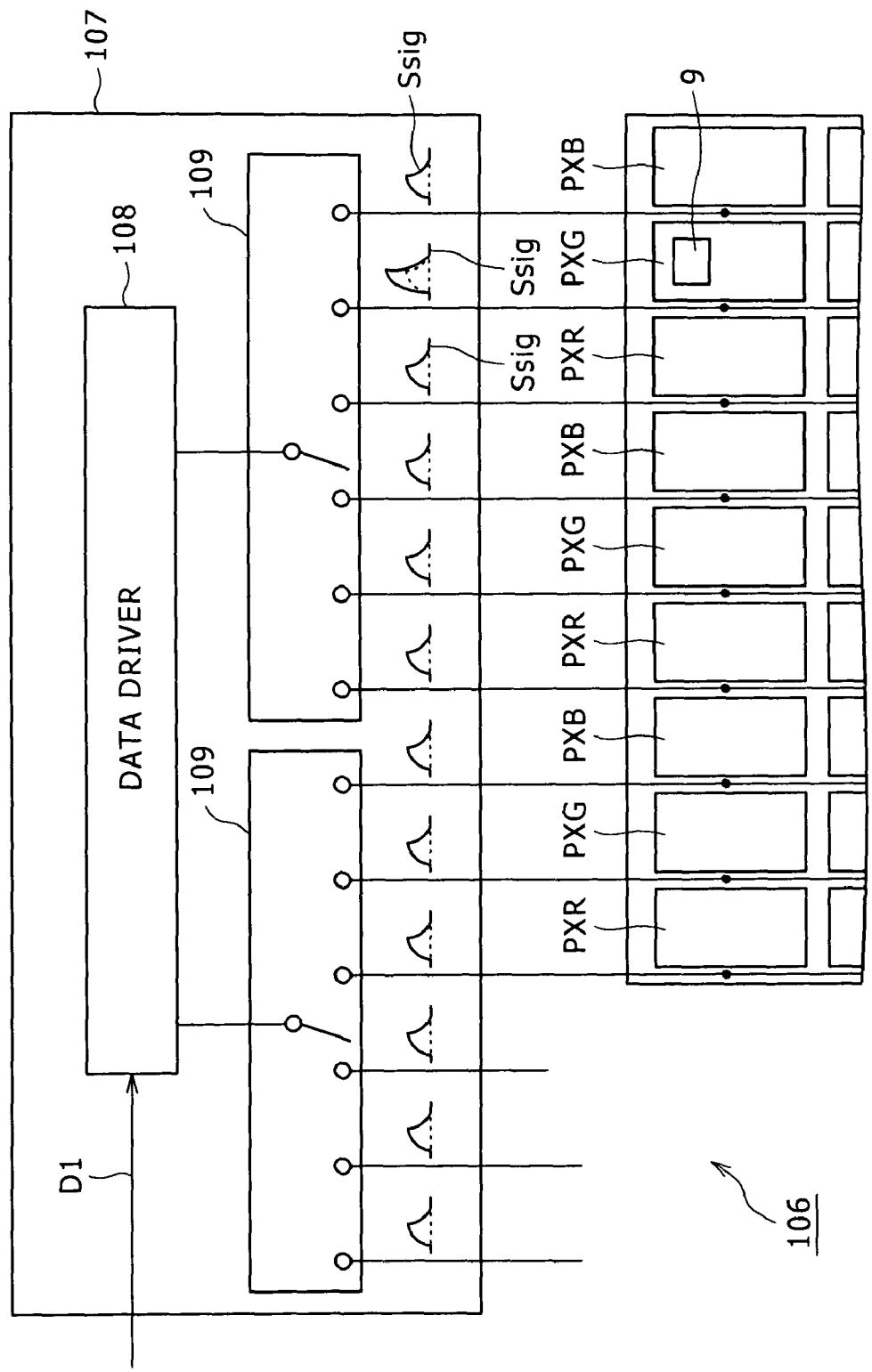
FIG. 19 is a schematic diagram for explaining a liquid crystal display panel applied to a liquid crystal display device according to a sixth embodiment of the present invention.
Figure 20:
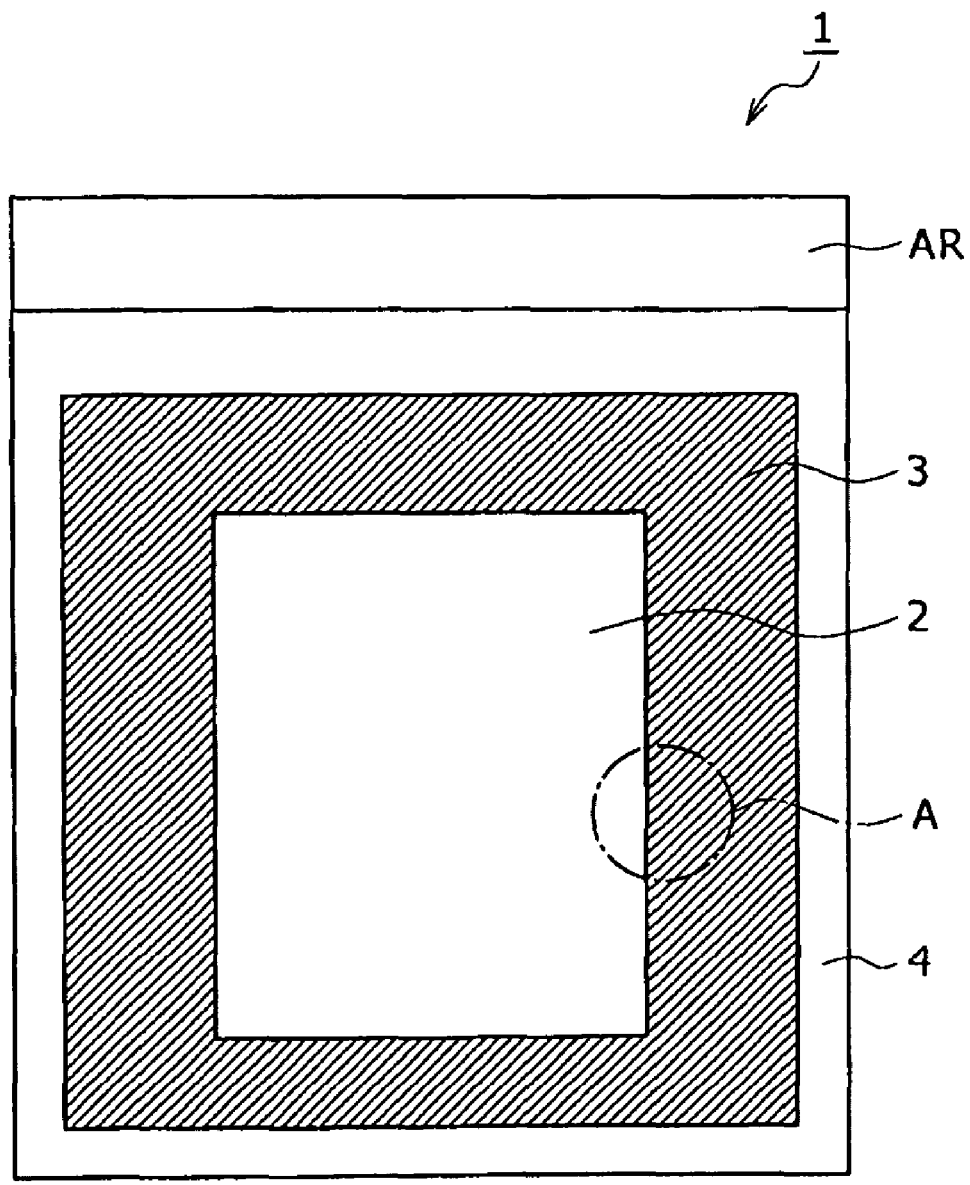
FIG. 20 is a plan view for explaining a related-art liquid crystal display panel.

FIG. 19 is a schematic diagram for explaining a liquid crystal display device according to a sixth embodiment of the present invention. In this display device 106, a data driver 108 is provided in an H driver 107. The data driver 108 is an integrated circuit obtained by integrating the latch circuits 102, the reference voltage generator 103, and the selectors 104 described above with FIG. 17, and is fabricated by a semiconductor manufacturing process. The data driver 108 outputs the drive signals generated for the respective signal lines SIG after time-division multiplexing thereof. Thus, in the example of FIG. 19, the number of output terminals of the data driver 108 is reduced to ⅙ of the number of signal lines SIG. The data driver 108 outputs the drive signal whose amplitude is increased for the sub-pixel in which the ambient light sensor 9 is disposed, based on the method described above for the fifth embodiment. In FIG. 19, the amplitude of the drive signal for driving the signal line is schematically shown beside each signal line SIG.

In this display device 106, the data driver 108 is mounted on the TFT substrate 5 (see FIGS. 1A and 1B). This mounting is simplified corresponding to the reduction in the number of output terminals of the data driver 108. The display device 106 sorts and outputs the drive signals output from this data driver 108 to the corresponding signal lines SIG by a selector 109 fabricated on the TFT substrate 5.

Also when plural signal lines are driven in a time-division manner like this embodiment, the same advantage as that of the fifth embodiment can be achieved.

Seventh Embodiment

In the above-described embodiments, only the ambient light sensor is provided. However, the embodiments of the present invention is not limited thereto but can be widely applied also to the case in which a correction sensor is also disposed. In this case, the correction sensor may be disposed in the light-blocking area as with the above description with FIGS. 22A and 22B. Alternatively, it may be disposed in the effective pixel area similarly to the ambient light sensor. When the correction sensor is disposed in the effective pixel area, it may be disposed in the pixel in which the ambient light sensor 9 is disposed. Alternatively, it may be disposed in a pixel that is adjacent to or in the vicinity of the pixel in which the ambient light sensor 9 is disposed. One correction sensor may be disposed per plural ambient light sensors. If the correction sensor is provided in the effective pixel area, the aperture area is decreased due to the provision of the correction sensor similarly to the provision of the ambient light sensor. In this case, image quality deterioration can be prevented by correcting local hue change by the same method as that in any of the above-described embodiments.

It is unnecessary that ambient light is incident on the correction sensor. Therefore, in the case of providing the correction sensor in the effective pixel area in a reflective liquid crystal display device, the correction sensor can be provided under the reflective electrode (on the insulating substrate 10 of the TFT substrate 5 (FIG. 21B)) so that the functions of the reflective electrode will not be spoiled at all. Thus, in this case, the aperture area of the pixel in which the correction sensor is disposed is not lowered although the correction sensor is provided in the effective pixel area. Consequently, the provision of the hue correction mechanism corresponding to the provision of the correction sensor is unnecessary in this case.

Eighth Embodiment

In the above-described fifth embodiment, the amplitude of the drive signal of the signal line is increased through switching of the reference voltage for digital-analog conversion. However, the embodiments of the present invention are not limited thereto but various schemes, such as a scheme in which the grayscale of image data is corrected to increase the amplitude of the drive signal of the signal line, can be widely applied.

In the above-described embodiments, one ambient light sensor is provided in one sub-pixel. However, the embodiments of the present invention are not limited thereto but can be widely applied also to the case in which one ambient light sensor is provided in plural sub-pixels in a divided manner. In this case, the plural sub-pixels to which one ambient light sensor is allocated are so designed as to have the same aperture area for example by applying the above-described hue correction mechanism. For the other sub-pixels that form pixels for color images together with the plural sub-pixels to which one ambient light sensor is allocated, e.g. the aperture area thereof is set equal to that of these plural sub-pixels by applying the above-described hue correction mechanism similarly.

In the above-described embodiments, the ambient light sensors may be disposed either discretely or collectively. However, the embodiments of the present invention are not limited thereto but can be widely applied also to the case in which the ambient light sensors are disposed with a certain pitch on the outermost periphery of the effective pixel area, in a predetermined area in the effective pixel area, or across the whole of the effective pixel area. This certain pitch is e.g. the one-pixel pitch or a plural-pixel pitch.

In this case, the occurrence of the following situation will be predicted. Specifically, the pixels in which the ambient light sensors are disposed and the pixels in which the ambient light sensor is not disposed are alternately repeated with a predetermined cycle, and thus the lowering of the luminance value in the pixels in which the ambient light sensors are disposed is conspicuous similarly to the above description for the third embodiment (FIG. 9). To avoid this situation, dummy light blockers may be provided in the pixels in which the ambient light sensor is not disposed in this repetition pattern similarly to the above description for the third embodiment so that the lowering of the luminance value in the pixels in which the ambient light sensors are disposed can be made inconspicuous. This can reduce a sense of discomfort felt by a user. If the dummy light blockers are provided, the area of the dummy light blocker may be gradually decreased as the distance thereof from the pixel in which the ambient light sensor is provided becomes larger if this certain pitch is a plural-pixel pitch. This can reduce the lowering of the luminance value in the entire screen as a whole.

In the above-described third embodiment, the dummy light blockers are provided in the outermost peripheral pixels in which the ambient light sensor is not disposed so that a sense of discomfort in displaying of a narrow white frame image may be eliminated. However, the embodiment of the present invention is not limited thereto but the light blockers may be provided also in other part in such a way that the area of the light blocker is gradually decreased as the position thereof shifts from this outermost periphery toward the screen center. This can obscure the lowering of the luminance value due to the provision of the ambient light sensors, the light blockers, and the dummy light blockers in the outermost peripheral pixels.

In the above-described embodiments, the ambient light sensor is disposed in the effective pixel area for the purpose of acquisition of the result of ambient light detection for luminance adjustment. However, the embodiment of the present invention are not limited thereto but can be widely applied also to e.g. the case in which the ambient light sensor is disposed in the effective pixel area for the purpose of forming a liquid crystal display device equipped with a touch panel. Specifically, in the liquid crystal display device equipped with a touch panel, ambient light sensors are provided in predetermined sub-pixels along the vertical direction and the horizontal direction with a predetermined pixel pitch. In the case of a transmissive liquid crystal display device, the ambient light sensors receive light that is emitted from a liquid crystal cell and reflected by a finger or the like as ambient light. Furthermore, the output signals of the plural ambient light sensors provided in the effective pixel area are processed to thereby detect the position at which the ambient light amount is increased by the ambient light sensors. Thereby, the position touched by the user is detected. In contrast, in a reflective liquid crystal display device, light blocking by a finger or the like is detected by the ambient light sensor, and thereby the position touched by the user is detected. Also when the embodiments of the present invention are applied to display devices in which the ambient light sensor is disposed in the effective pixel area for various purposes in this manner, the same advantages as those of the above-described embodiments can be achieved.

The above-described embodiments relate to application to a liquid crystal display panel. However, the embodiments of the present invention are not limited thereto but can be widely applied also to various self-luminous display panels such as an organic EL (electro luminescence) display panel. For the self-luminous display panel, luminance adjustment is carried out by controlling the light-emission luminance of the respective pixels instead of the light amount of a backlight device.

The present invention relates to a display device and a method for luminance adjustment of a display device, and can be applied to e.g. a liquid crystal display device.

It should be understood by those skilled in the art that various modifications, combinations, sub-combinations and alterations may occur depending on design requirements and other factor in so far as they are within the scope of the appended claims or the equivalents thereof.

What is claimed is:

1. A display device that displays a desired image on an effective pixel area in which sub-pixels having different colors are arranged in a matrix, the display device comprising:
   an ambient light sensor configured to be provided in a predetermined color sub-pixel in the effective pixel area, the ambient light sensor receiving ambient light and outputting a result of detection of an ambient light amount for adjustment of luminance of the image; and
   a hue correction mechanism configured to correct local hue change due to provision of the ambient light sensor in the predetermined color sub-pixel,
   wherein the hue correction mechanism is achieved through an increase in a capacity of a hold capacitance or an increase in an amplitude of a pixel voltage such that hue change due to the an aperture ratio decrease accompanying the provision of the ambient light sensor is corrected.

2. The display device according to claim 1, wherein the hue correction mechanism is an aperture limiting mechanism that limits apertures of other color sub-pixels that form one pixel for a color image together with the predetermined color sub-pixel.

3. The display device according to claim 2, wherein the aperture limiting mechanism is a light blocker that partially blocks the apertures of the other color sub-pixels.

4. The display device according to claim 3, wherein the predetermined color sub-pixel is a green sub-pixel on outermost periphery of the effective pixel area.

5. The display device according to claim 4, wherein a light blocker that partially blocks an aperture is formed in a green sub-pixel that is on the outermost periphery of the effective pixel area and in which the ambient light sensor is not disposed and other color sub-pixels corresponding to the green sub-pixel in which the ambient light sensor is not disposed.

6. The display device according to claim 4, wherein a plurality of light blockers that partially block the apertures of the other color sub-pixels corresponding to the green sub-pixels that have the ambient light sensor are continuous along the vertical direction.

7. The display device according to claim 3, wherein the predetermined color sub-pixel is a red sub-pixel and the other color sub-pixels include a green sub-pixel, and the light blocker for the red sub-pixel is formed to have an area equal to an area of the aperture lost in the green sub-pixel due to the provision of the ambient light sensor.

8. The display device according to claim 3, wherein
the predetermined color sub-pixel is a blue sub-pixel and the other color sub-pixels include a green sub-pixel, and the light blocker for the blue sub-pixel is formed to have an area equal to an area obtained by subtracting the area of the aperture lost in the blue sub-pixel due to the provision of the ambient light sensor.

9. The display device according to claim 1, wherein
the predetermined color sub-pixel is a green sub-pixel on outermost periphery of the effective pixel area.

10. The display device according to claim 1, wherein
the hue correction mechanism corrects the hue change by increasing an amplitude of a pixel voltage of the predetermined color sub-pixel compared with color sub-pixels different from the predetermined color sub-pixel.

11. The display device according to claim 10, wherein
the hue correction mechanism increases the amplitude of the pixel voltage by increasing a capacity of a hold capacitor compared with the color sub-pixels different from the predetermined color sub-pixel.

12. The display device according to claim 10, wherein
the hue correction mechanism increases the amplitude of the pixel voltage by increasing an amplitude of a drive signal of a signal line compared with the color sub-pixels different from the predetermined color sub-pixel.

13. The display device according to claim 1, wherein
the hue correction mechanism is achieved through an increase in an amplitude of a drive signal of a signal line by switching a reference voltage for digital-analog conversion processing such that hue change due to the an aperture ratio decrease accompanying the provision of the ambient light sensor is corrected.

14. A method for luminance adjustment of a display device that displays a desired image on an effective pixel area in which sub-pixels having different colors are arranged in a matrix, the method comprising the steps of:

receiving ambient light by an ambient light sensor provided in a predetermined color sub-pixel in the effective pixel area and outputting a result of detection of an ambient light amount for adjustment of luminance of the image;

adjusting the luminance of the image based on the result of the detection of the ambient light amount; and correcting local hue change due to provision of the ambient light sensor in the predetermined color sub-pixel by a hue correction mechanism, wherein the correcting the local hue is achieved through an increase in a capacity of a hold capacitance or an increase in an amplitude of apixel voltage such that hue change due to the an aperture ratio decrease accompanying the provision of the ambient light sensor is corrected.

15. A display device that displays a desired image on an effective pixel area in which sub-pixels having different colors are arranged in a matrix, the display device comprising:

an ambient light sensor configured to be provided in a predetermined color sub-pixel in the effective pixel area, the ambient light sensor receiving ambient light and outputting a result of detection of an ambient light amount; and a hue correction mechanism configured to correct local hue change due to provision of the ambient light sensor in the predetermined color sub-pixel, wherein the correcting the local hue is achieved through an increase in a capacity of a hold capacitance or an increase in an amplitude of a pixel voltage such that hue change due to the an aperture ratio decrease accompanying the provision of the ambient light sensor is corrected.

* * * * *